United States Patent
Zhao et al.

(10) Patent No.: US 12,511,415 B2
(45) Date of Patent: Dec. 30, 2025

(54) DATA USE CONTROL METHOD AND SYSTEM, ELECTRONIC DEVICE AND STORAGE MEDIUM

(71) Applicants: Beijing BOE Technology Development Co., Ltd., Beijing (CN); BOE Technology Group Co., Ltd., Beijing (CN)

(72) Inventors: Junjie Zhao, Beijing (CN); Jing Su, Beijing (CN); Shaobei Chen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 245 days.

(21) Appl. No.: 18/034,361

(22) PCT Filed: Oct. 21, 2021

(86) PCT No.: PCT/CN2021/125433
§ 371 (c)(1),
(2) Date: Apr. 27, 2023

(87) PCT Pub. No.: WO2022/089303
PCT Pub. Date: May 5, 2022

(65) Prior Publication Data
US 2023/0315886 A1    Oct. 5, 2023

(30) Foreign Application Priority Data
Oct. 30, 2020 (CN) .......................... 202011196936.8

(51) Int. Cl.
G06F 21/62    (2013.01)
G06F 21/60    (2013.01)

(52) U.S. Cl.
CPC ........ *G06F 21/6218* (2013.01); *G06F 21/604* (2013.01)

(58) Field of Classification Search
CPC .... G06F 21/6218; G06F 21/604; G06F 21/64; G06F 21/62; G06F 21/10; H04L 63/102; H04L 63/20
See application file for complete search history.

(56) References Cited

U.S. PATENT DOCUMENTS

| 10,592,683 B1* | 3/2020 | Lim ...................... H04L 63/102 |
| 2001/0023421 A1* | 9/2001 | Numao ............... G06F 21/6218 707/999.009 |

(Continued)

FOREIGN PATENT DOCUMENTS

| CN | 104217146 A | 12/2014 |
| CN | 106778348 A | 5/2017 |

(Continued)

OTHER PUBLICATIONS

The Telecommunication Technology Committee. "TR-M2M-0008v1.0.0 Analysis of security solutions for the oneM2M system." Technical Report, Apr. 10, 2014.

(Continued)

*Primary Examiner* — Catherine Thiaw
*Assistant Examiner* — Nega Woldemariam
(74) *Attorney, Agent, or Firm* — IPro, PLLC

(57) ABSTRACT

A data use control method comprises: (S12) receiving a data use request which comprises a target resource to be used; (S14) acquiring a use control policy of the target resource; and (S16) using the target resource according to the use control policy of the target resource. Further, a data use control system (10), an electronic device (20) and a storage medium (30) are also disclosed.

15 Claims, 16 Drawing Sheets

(56) References Cited

U.S. PATENT DOCUMENTS

| | | | |
|---|---|---|---|
| 2007/0143851 A1* | 6/2007 | Nicodemus | G06F 11/3495 726/4 |
| 2008/0194296 A1* | 8/2008 | Roundtree | G06F 21/62 455/558 |
| 2009/0030923 A1 | 1/2009 | Chalmers et al. | |
| 2009/0271856 A1* | 10/2009 | Doman | H04L 63/20 726/9 |
| 2012/0311131 A1* | 12/2012 | Arrasvuori | G06F 21/6245 709/224 |
| 2012/0324529 A1* | 12/2012 | Rangachari | H04L 63/20 726/1 |
| 2015/0106422 A1* | 4/2015 | Svoboda | H04L 67/60 709/202 |
| 2017/0237747 A1* | 8/2017 | Quinn | G06F 21/602 726/29 |
| 2018/0262512 A1 | 9/2018 | Zhao | |
| 2020/0036707 A1* | 1/2020 | Callahan | H04L 67/53 |
| 2020/0110894 A1* | 4/2020 | Binkley | G06F 21/6227 |
| 2021/0157848 A1* | 5/2021 | Doshi | G06F 16/907 |
| 2021/0392142 A1* | 12/2021 | Stephens | H04L 63/104 |
| 2023/0315886 A1* | 10/2023 | Zhao | H04L 63/102 726/1 |
| 2023/0385440 A1* | 11/2023 | Binkley | G06F 21/6227 |

FOREIGN PATENT DOCUMENTS

| | | |
|---|---|---|
| CN | 107908973 A | 4/2018 |
| WO | 2020038400 A1 | 2/2020 |

OTHER PUBLICATIONS

EP21885030.3 extended European search report dated Aug. 1, 2024.
PCT/CN2021/125433 international search report.
PCT/CN2021/125433 Written Opinion.

* cited by examiner

DATA USE CONTROL METHOD AND SYSTEM, ELECTRONIC DEVICE AND STORAGE MEDIUM

CROSS-REFERENCE TO RELATED APPLICATIONS

The present disclosure is the U.S. national phase of PCT Application No. PCT/CN2021/125433 filed on Oct. 21, 2021, which claims priority to the Chinese Patent Application No. 202011196936.8 entitled "DATA USE CONTROL METHOD AND SYSTEM, ELECTRONIC DEVICE AND STORAGE MEDIUM", filed with the Chinese Patent Office on Oct. 30, 2020, which is incorporated herein by reference in its entirety.

TECHNICAL FIELD

The present application relates to information security, and in particular, to a data use control method, a data use control system, an electronic device and a storage medium.

BACKGROUND

In related technologies, with developments of Internet of Things, more and more devices are connected to an Internet of Things system. In order to manage access of Internet-of-Things applications to resources, access control policies are usually used for controlling. The Internet-of-Things applications can access and utilize data of Internet-of-Things devices by accessing the resources. For functional modules that use the data, access control over a target resource (data) can be achieved through the access control policies, but there is no restriction on how to use the target resource (data), which may lead to data abuse.

SUMMARY

In embodiments of the present application, there are provided a data use control method, a data use control system, an electronic device and a storage medium.

The data use control method in the embodiments of the present application comprises: receiving a data use request which includes a target resource to be used; acquiring a use control policy of the target resource; and using the target resource according to the use control policy.

In some embodiments, the use control policy includes one or more of data use range, data use purpose, data integrity, data use times, data use time, data validity period, data anonymity, data aggregation, data isolation, event-based data use control, data use record, data post-use action and data sharing.

In some embodiments, the data use control method further comprises: creating a target resource according to a registering request of an Internet-of-Things device; and setting a use control policy for the target resource according to a setting request of the Internet-of-Things device or a setting request of an Internet-of-Things device management application.

In some embodiments, setting the use control policy for the target resource comprises: creating a use control policy resource corresponding to the target resource, where sub-attributes of the use control policy resource include the use control policy; or setting an access control data use privilege in a privilege attribute of an access control policy resource of the target resource, where the access control data use privilege includes the use control policy.

In some embodiments, the data use request comprises an updating request, and the data use control method further comprises: creating a data analysis functional resource according to a creation request of a functional module, wherein the data analysis functional resource comprises an identifier for a data resource to be analyzed; triggering the data analysis functional resource according to the updating request of the functional module to acquire the target resource in the data resource to be analyzed; acquiring a use control policy of the data resource to be analyzed; and in a case where the updating request meets the use control policy of the data resource to be analyzed, feeding an update response back to the functional module to enable the functional module to use the target resource in the data resource to be analyzed according to the use control policy of the data resource to be analyzed.

In some embodiments, the data use request comprises an operation request, and the data use control method further comprises: receiving the operation request and determining whether the operation request is an acquiring request, wherein the operation request comprises a requester identifier, a request target and a request type; and in a case where the operation request is not the acquiring request, acquiring an access control policy corresponding to the request target and returning a first operation response according to the access control policy corresponding to the request target.

In some embodiments, the data use control method further comprises: in a case where the operation request is the acquiring request, determining whether a requester is an application entity to which a receiver belongs; in a case where the requester is not the application entity to which the receiver belongs, returning a second operation response which comprises a target resource protected by digital copyrights; and in a case where the requester is the application entity to which the receiver belongs, acquiring a use control policy corresponding to the request target, and when the operation request meets the use control policy corresponding to the request target, returning a third operation response which comprises a target resource corresponding to the request target.

In some embodiments, the data use request comprises an operation request, and the data use control method further comprises: receiving the operation request and determining whether a request target of the operation request is a functional resource, wherein the operation request comprises a requester identifier, the request target and a request type; and in a case where the request target of the operation request is the functional resource, acquiring a use control policy corresponding to the request target, and when the operation request meets the use control policy corresponding to the request target, returning a fourth operation response which comprises a target resource corresponding to the request target.

In some embodiments, the data use control method further comprises: in a case where the request target of the operation request is not the functional resource, determining whether a requester is an application entity to which a receiver belongs; in a case where the requester is not the application entity to which the receiver belongs, returning a fifth operation response which comprises a target resource protected by digital copyrights; and in a case where the requester is the application entity to which the receiver belongs, acquiring a use control policy corresponding to the request target, and when the operation request meets the use control policy corresponding to the request target, returning the fourth operation response.

In some embodiments, the data use request comprises an updating request, and the data use control method further comprises: receiving the updating request which comprises a requester identifier, a request target and a data aggregation functional resource to which the request target directs; in a case where the updating request meets an access control policy corresponding to the request target, determining whether the request target is a functional resource; in a case where the request target is the functional resource, determining whether the updating request meets a use control policy related to a preset function; and in a case where the updating request meets the use control policy related to the preset function, executing the preset function and returning a successful response, wherein the preset function comprises a data aggregation function, a data isolation function, an event-based data use function and/or a data disuse function.

In some embodiments, determining whether the updating request meets the use control policy related to the preset function comprises: determining whether data to be analyzed meets a data aggregation control policy defined by each of data resources.

In some embodiments, the data use control method further comprises: before executing the data aggregation function, determining whether the updating request meets event notification rules.

A data use control system in the embodiments of the present application comprises: a receiving module which is configured to receive a data use request, which comprises a target resource to be used; an acquiring module which is configured to acquire a use control policy of the target resource; and a processing module which is configured to use the target resource according to the use control policy.

An electronic device in the embodiments of the present application comprises: one or more processor and a memory, where the memory stores a computer program, and the computer program is executed by the one or more processors to implement the data use control method according to any one of the above embodiments.

A storage medium in the embodiments of the present application stores a computer program therein, where the computer program is executed by one or more processors to implement the data use control method according to any one of the above embodiments.

In the data use control method and system, the electronic device and the computer storage medium according to the embodiments of the present application, by setting the use control policy for the target resource, after the data use request is received, the use control policy for the target resource is acquired, so as to use the target resource according to the use control policy. In this way, the system can protect utilization of data, which facilitates protection and utilization of data.

Additional aspects and advantages of the embodiments of the present application will be given in the following description, parts of which will become apparent from the following description or be understood through practice of the embodiments of the present application.

BRIEF DESCRIPTION OF THE DRAWINGS

The above and/or additional aspects and advantages of the present application will become apparent and easy to understand from following description of embodiments with reference to accompanying drawings in which.

DETAILED DESCRIPTION OF THE EMBODIMENTS

Figure 1:
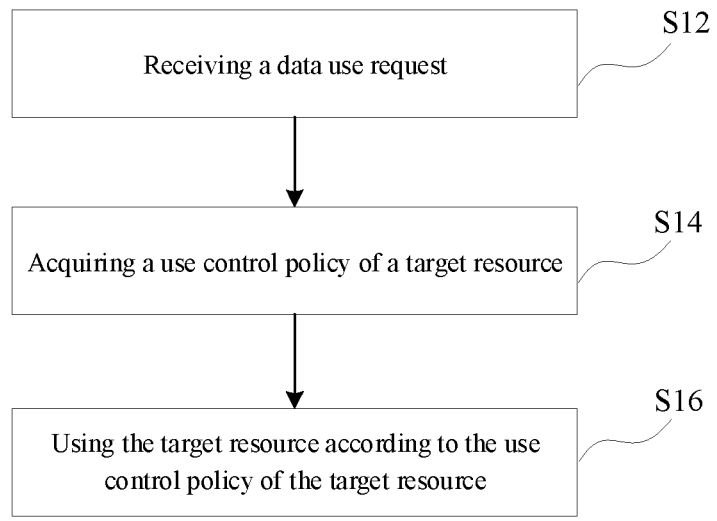
FIG. 1 illustrates a schematic flowchart of a use control method according to an embodiment of the present application.
Figure 2:
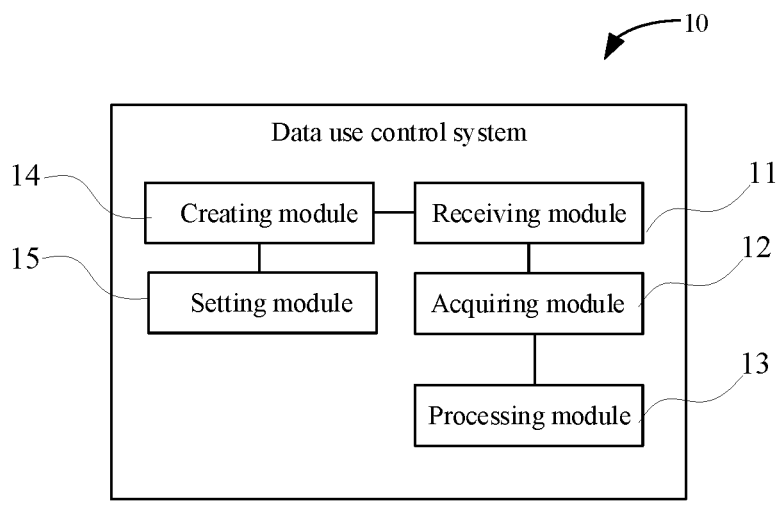
FIG. 2 illustrates a schematic modular diagram of a use control system according to an embodiment of the present application.
Figure 3:
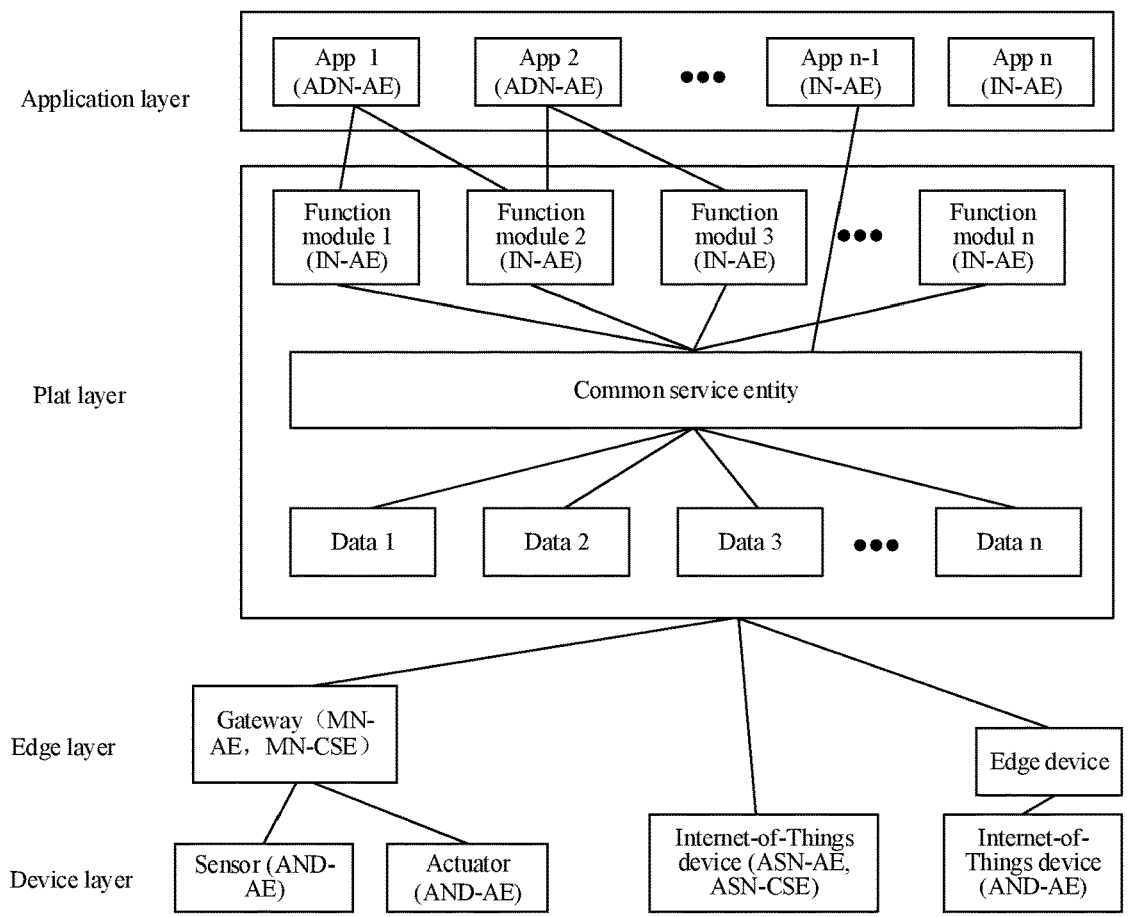
FIG. 3 illustrates a schematic Internet-of-Things platform framework according to an embodiment of the present application.
Figure 4:
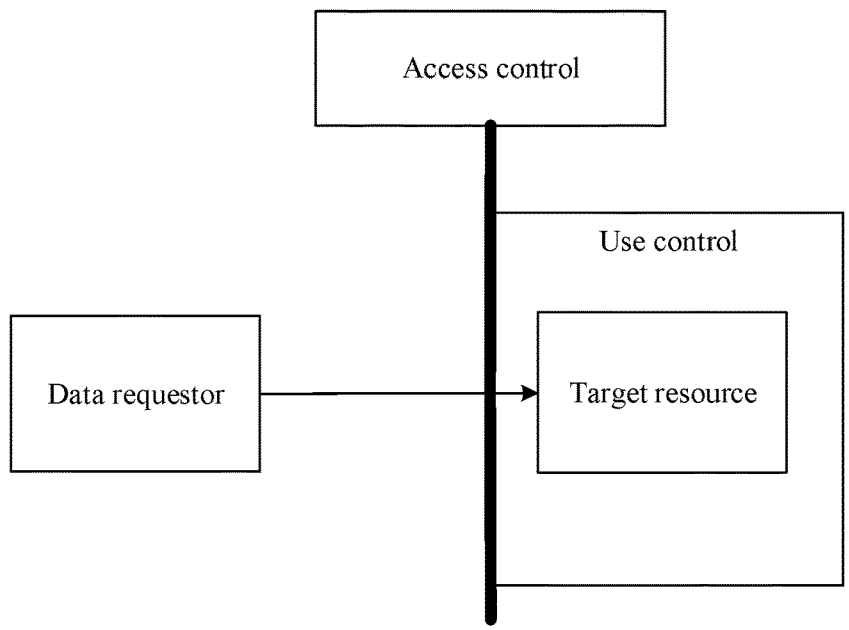
FIG. 4 illustrates a principal diagram of a use control method according to an embodiment of the present application.

The embodiments of the present application will be described in detail below, which are schematically illustrated in the accompanying drawings. Like or similar reference numerals throughout the present application refer to like or similar elements or elements with like or similar functions. The embodiments described below with reference to the drawings are exemplary and are used only to explain the present application, but not intended to limit the present application.

In the description of the present application, it should be understood that terms such as "first" and "second" are used only for purpose of describing, but they cannot be understood as indicating or implying relative importance or implicitly indicating a number of indicated technical features. Therefore, features defined with "first" and "second" can explicitly or implicitly include one or more of the features. In the description of the present application, "multiple" and "a plurality of" refer to two or more, unless clearly indicated otherwise.

The embodiments of the present application will be described in detail below, which are schematically illustrated in the accompanying drawings. Like or similar reference numerals throughout the present application refer to like or similar elements or elements with like or similar functions. The embodiments described below with reference to the drawings are exemplary and are used only to explain the present application, but not intended to limit the present application.

Referring to FIGS. 1 to 4, in embodiments of the present application, there is provided a data use control method to enable an Internet-of-Things platform to control conditions of using data on the platform, such as purposes of use, ways of use, and restrictions of use, so that a system thereof can protect the use of data, which is beneficial to protect and use the data.

In the embodiments of the present application, there is further provided a data use control system. The data use control method in the embodiments of the present application can be used in the data use control system in the embodiments of the present application. That is to say, the data use control system in the embodiments of the present application can adopt the data use control method in the embodiments of the present application to enable an Internet-of-Things platform to control conditions of using data on the platform, such as purposes of use, ways of use, and restrictions of use, so that a system thereof can protect the use of data, which is beneficial to protect and use the data.

In some embodiments, the data use control method includes:
- a step S12 of receiving a data use request which includes a target resource to be used;
- a step S14 of acquiring a use control policy of the target resource; and
- a step S16 of using the target resource according to the use control policy of the target resource.

Specifically, the data use control system includes a receiving module 11, an acquiring module 12 and a processing module 13. The step S12 can be implemented by the receiving module 11, the step S14 can be implemented by the acquiring module 12, and the step S16 can be implemented by the processing module 13. That is to say, the receiving module 11 can be configured to receive the data use request, the acquiring module 12 can be configured to acquire the use control policy of the target resource, and the processing module 13 can be configured to use the target resource according to the use control policy of the target resource.

It can be understood that, for the Internet-of-Things platform, sensors and other Internet-of-Things devices which have limited capabilities are connected to the Internet-of-Things platform through an Internet-of-Things gateway, and full function Internet-of-Things devices can be connected to the Internet-of-Things platform directly or through an Internet-of-Things gateway. The Internet-of-Things platform centrally manages all kinds of devices and provides an interface for upper layer applications. Internet of Things applications can access data of the devices and control the devices through the Internet-of-Things platform.

Taking mobile health as an example, when a user uses a device such as a mobile phone, a wearable device or the like, user data including heartbeat, blood pressure, sleep time and the like will be sent to the Internet-of-Things platform through the device. A third-party application can access the user data and provide health and fitness suggestions, plans and other services for the user through the Internet-of-Things platform. In order to protect the data of the Internet-of-Things devices and prevent unauthorized applications/users from accessing the data of the Internet-of-Things devices, the access of the users/applications of the Internet of Things needs to be controlled. For example, an access control policy resource corresponding to the target resource is created to achieve the access control over the target resource (data). For the mobile health, since a variety of functions such as device management, data analysis, trajectory analysis and the like are integrated, most of user behaviors can be tracked in real time. Only controlling the access to the target resource may have a great impact on user privacy.

In the data use control method and the data use control system according to the embodiments of the present application, by setting the use control policy for the target resource, after the data use request is received, the use control policy for the target resource is acquired, so as to use the target resource according to the use control policy, so that the system can protect the use of data, which is beneficial to protect and use the data.

In some embodiments, the use control policy includes one or more of data use range, data use purposes, data integrity, data use times, data use time, data validity period, data anonymity, data aggregation, data isolation, event-based data use control, data use record, data post-use action and data sharing.

Specifically, corresponding relationships between some use control policies and values can be as shown in the following table:

| Use control policy | Value or description |
|---|---|
| Access control originators | Domain, originator ID, all, Role-ID |
| Data use range | The data use range can specify applications of a platform, except that the data us is not available; its values are CSE (common service entity), AE (application entity), CSF (common service function), resources, etc. |
| Data use purpose | Its values are common service and personalized service |
| Access control contexts | accessControlTimeWindow, accessControlLocationRegion, accessControlIPAddress, accessControlUserIDs, accessControlEvalCriteria, accessControlLimit |
| Data integrity | Its values are modifiable data or non-modifiable data |
| Data use times | |
| Data use time | Data may be acquired by applications and a platform can specify a time when the data can be used by specifying the data use time |
| Data validity period | Lifetime of data on a platform |
| Access control operations | RETRIEVE, CREATE, UPDATE, DELETE, DISCOVER, NOTIFY |
| Access control object details | resourceType, specialization, childResourceType |
| Access control authentication identifier | Whether an originator is authenticated or not |
| Access control attributes | Resource attributes |
| Data anonymity | During using data, the data needs to be anonymized, and sensitive information, such as personal identifier information, identity information and address information, needs to be replaced to avoid revealing personal privacy |
| Data aggregation | During using data, the data needs to be aggregated, and when untrusted applications use the data, the data needs to be aggregated; through aggregation, the untrusted applications cannot analyze data of a single user to affect privacy of the user |
| Data isolation | During using data, the data needs to be isolated, and when the data is from a competitor, the data needs to be isolated |
| Event-based data use control | Event-based data use or data disuse: data can be used when an event occurs, in which subscription resources can be associated and specific events can be set through event notification rules under the subscription resources; and the data cannot be used when an event occurs. |
| Records for recording data use | Usages of data are recorded through logs |
| Data post-use action | After certain data is used, an action such as notifying a resource, a user or a group is executed |
| Data sharing | It can be defined whether to share data |

Further, in an example, for the data use range, in a use control policy of a target resource, the data use range can specify application of data of the target resource on a platform, and the data of the target resource will not be applied beyond the platform. Values and corresponding description of the data use range can be as shown below:

| Value | Description |
|---|---|
| CSE | MN(middle node)-CSE, ASN(application service node)-CSE, IN(infrastructure node) -CSE |
| AE | MN-AE, ASN-AE, IN-AE, AND-AE |
| CSF | DMG(device management), REG(registration management), GRP(group management), AI(artificial intelligence), BLOCKCHAIN, ML(machine learning) |
| Resource | Container, action, status |

It can be understood that, for the CSE, a user can set that data of the target resource uploaded from a device can be used only for IN-CSE. At this time, the data corresponding to the target resource is not allowed to be exchanged between service providers. For the AE, by setting the AE, it can be specified which applications can use the data of the target resource. For the CSF, by setting the CSF, it can be specified which functions can use the data of the target resource. For the Resources, it can be set that some resources can use the data of the target resource.

In an example, for the data use purpose, it can be determined whether the data of the target resource is allowed to be used according to functions of a data user. If the data use purpose does not meet requirements, the data of the target resource will not be allowed to be used. For example, data of vehicles can be used only for trend analysis. Values and corresponding description of the data use purpose can be as shown below:

| Value | Description |
|---|---|
| Common service | Trend analysis: road traffic congestion analysis, etc. Disease diagnosis: disease pathology analysis through big data |
| Personalized service | Recommendation based on interests: content recommendation through existing interests |

It can be understood that, when the data use purpose for the use control policy of the target resource is Common service, for example, the data of vehicles may be used for trend analysis such as road traffic congestion analysis, or for disease diagnosis of disease pathology analysis through big data, and when the data use purpose meets requirements, the data of the target resource can be used for corresponding analysis module. When the data use purpose for the use control policy of the target resource is Personalized service, the data of the target resource can be used to realize a function of recommendation based on interests by way of content recommendation through existing interests.

In an example, for the Data integrity, it can be used to determine whether a requester is allowed to modify data. Values and corresponding description of the Data integrity can be as shown below:

| Value | Description |
|---|---|
| 1 | Data is allowed to be modified |
| 0 | Data is not allowed to be modified |

In an example, for the data use times, it can be used to limit a number of times of using the data of the target resource. Values of the data use times can be set according to actual needs, that is, the data use times can be any number. After a number of times using the data of the target resource that is allowed to be accessed is set, when the number is exceeded, the data of the target resource will be rejected to be used again.

In an example, for the data use time, it can be used to allow or prohibit the use of the data of the target resource in a specific time/a time range. Values and corresponding description of the data use time can be as shown below:

| Value | Description |
|---|---|
| Time allowed to use | It may be a time or a time period |
| Time not allowed to use | It may be a time or a time period |

It can be understood that, for example, when the time allowed to use in the use control policy is set on the hour, the applications can use the data of the target resource on the hour, so as to analyze and notify analysis results on the hour. For another example, when the time allowed to use in the use control policy is set as nighttime periods, the applications can acquire the data of the target resource related to sleep at night, so as to achieve sleep quality monitoring, etc.

In an example, for the Data validity period, lifetime of data in the target resource can be specified. The Data validity period may be a point of time or a period of time. For example, the Data validity period may be a certain point of time at an end of each month, and all data in the target resource can be deleted when the point of time is reached. New data of the next month can be recorded in the target resource. For another example, the Data validity period may be a period of time such as one month after the data has been created, and the corresponding data can be deleted after the data has been created for longer than one month.

Figure 5:
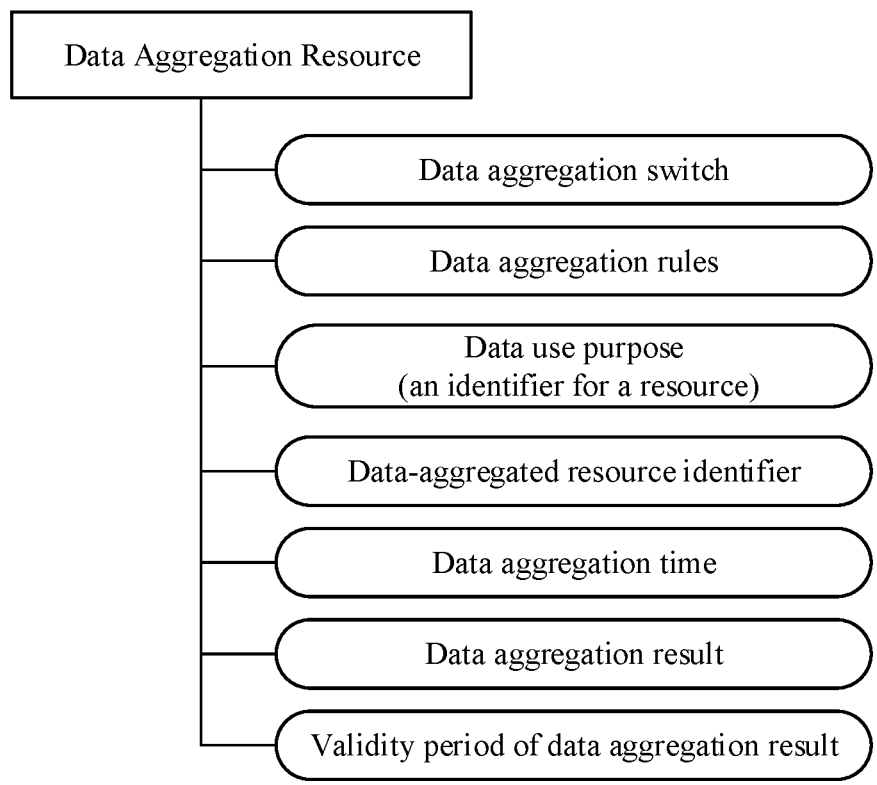
FIG. 5 illustrates a schematic structure of a data aggregation resource according to an embodiment of the present application.

Referring to FIG. 5, in an example, for the Data aggregation, the data of the target resource needs to be aggregated during using the data. Specifically, when untrusted applications use the data of the target resource, the data can be aggregated. By way of aggregating, the untrusted applications cannot analyze the data of a single user, such that privacy of the user is protected. Attributes and corresponding description of an aggregated resource can be as shown below:

| Attribute | Description |
|---|---|
| Data aggregation switch | Its value is turn-on or turn-off |
| Data use purpose | This attribute includes identifiers of resources for data use purpose |
| Data aggregation rules | Same attributes: e.g., same addresses or contact information; same resources: e.g., devices of the same type; same parent resources: e.g., members belonging to the same family, or sensors from the same factory; same child resource: e.g., members from the same family. |
| Data-aggregated resource identifier | This parameter includes an identifier for a data resource to be aggregated |
| Data aggregation time | Start and end times of data aggregation |
| Data aggregation result | Data aggregation result |
| Validity period of data aggregation result | Validity period of data aggregation result |

Figure 6:
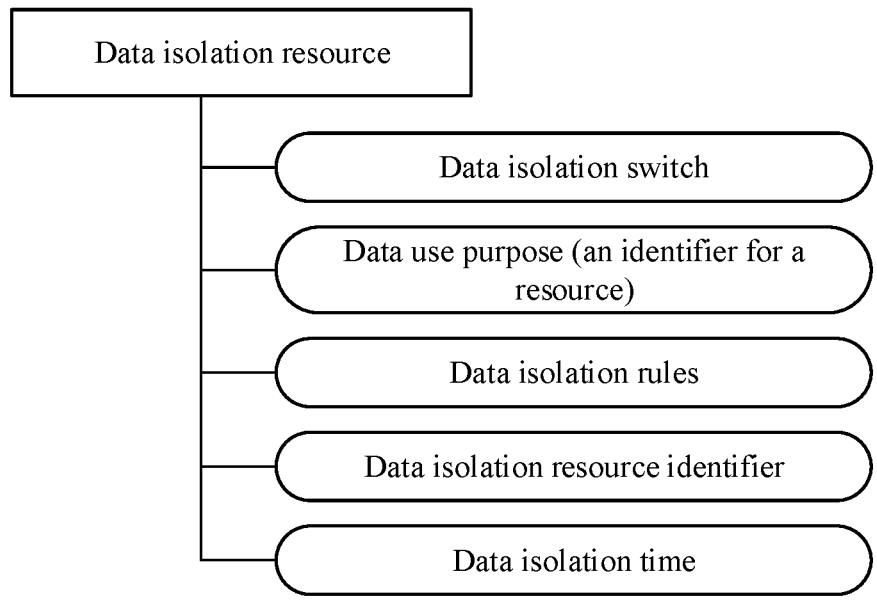
FIG. 6 illustrates a schematic structure of a data isolation resource according to an embodiment of the present application.

Referring to FIG. 6, in an example, for the data isolation, the data of the target resource needs to be isolated during using the data. Specifically, when the data of the target resource is from a competitor, the data needs to be isolated. Attributes and corresponding description of the data isolation can be as shown below:

| Attribute | Description |
| --- | --- |
| Data isolation switch | Its value is turn-on or turn-off |
| Data use purpose | This attribute includes identifiers of resources for data use purpose |
| Data isolation rules | Same attributes: e.g., same addresses or contact information; same resources: e.g., devices of the same type; same parent resources: e.g., members belonging to the same family, or sensors from the same factory; same child resource: e.g., members from the same family. |
| Data isolation resource identifier | This parameter includes an identifier of a data resource to be aggregated |
| Data isolation time | Start and end times of data aggregation |

Figure 7:
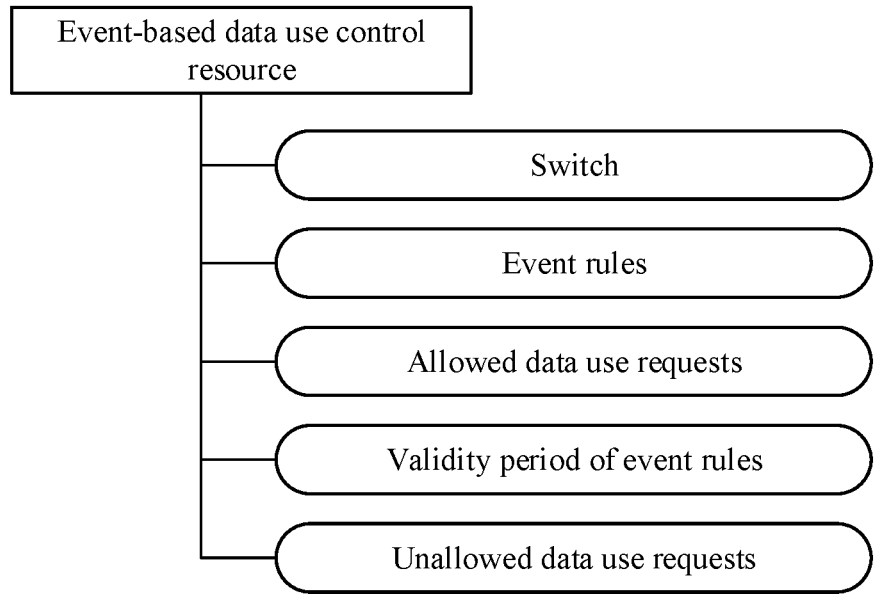
FIG. 7 illustrates a schematic structure of an event-based data use control policy resource according to an embodiment of the present application.

Referring to FIG. 7, in an example, for the event-based data use or disuse, data can be used when an event occurs, in which subscription resources can be associated and specific events can be set through event notification rules under the subscription resources; and the data cannot be used when an event occurs. Attributes and corresponding description of an event-based data use or disuse resource can be as shown below:

| Attribute | Description |
| --- | --- |
| Switch | Its value is turn-on or turn-off |
| Event rules | an event has a type defined by the event rules |
| Allowed data use requests | When an event occurs, the allowed data use requests include: (1) basic requests, such as a data acquiring request, a data updating request and a data notification request; (2) advanced functions, such as a data aggregation request and a data isolation request |
| Validity period of event rules | Valid times of event rules |
| Unallowed data use requests | When an event occurs, the unallowed data use requests include: (1) basic requests, such as a data acquiring request, a data updating request and a data notification request; (2) advanced functions, such as a data aggregation request and a data isolation request |

In an example, for the Records for recording data use, usages of data can be recorded through logs. Specifically, this attribute can invoke log resources and record identifiers of the log resources.

In an example, for the data post-use action, it may be an action, such as notifying a resource, a user or a group, which will be executed after certain data is used. This attribute can invoke action resources and record identifiers of the action resources.

Figure 8:
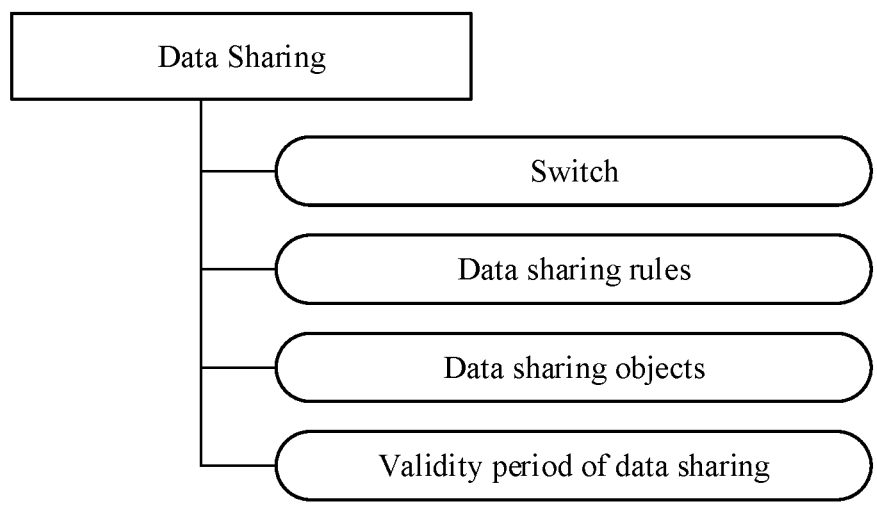
FIG. 8 illustrates a schematic structure of data sharing according to an embodiment of the present application.

Referring to FIG. 8, in an example, for the data sharing, it can be specified whether to share data of target resources. Attributes and corresponding description of the data sharing can be as shown below:

| Attribute | Description |
| --- | --- |
| Switch | Its value is turn-on or turn-off |
| Data sharing rules | Rules for selecting data sharing objects can be determined according to locations, resource types, node types, etc. |
| Data sharing objects | Identifiers of the data sharing objects |
| Validity period of data sharing | Lifetime of data after the data sharing objects acquire the data, which will be deleted if the lifetime is exceeded |

Figure 9:
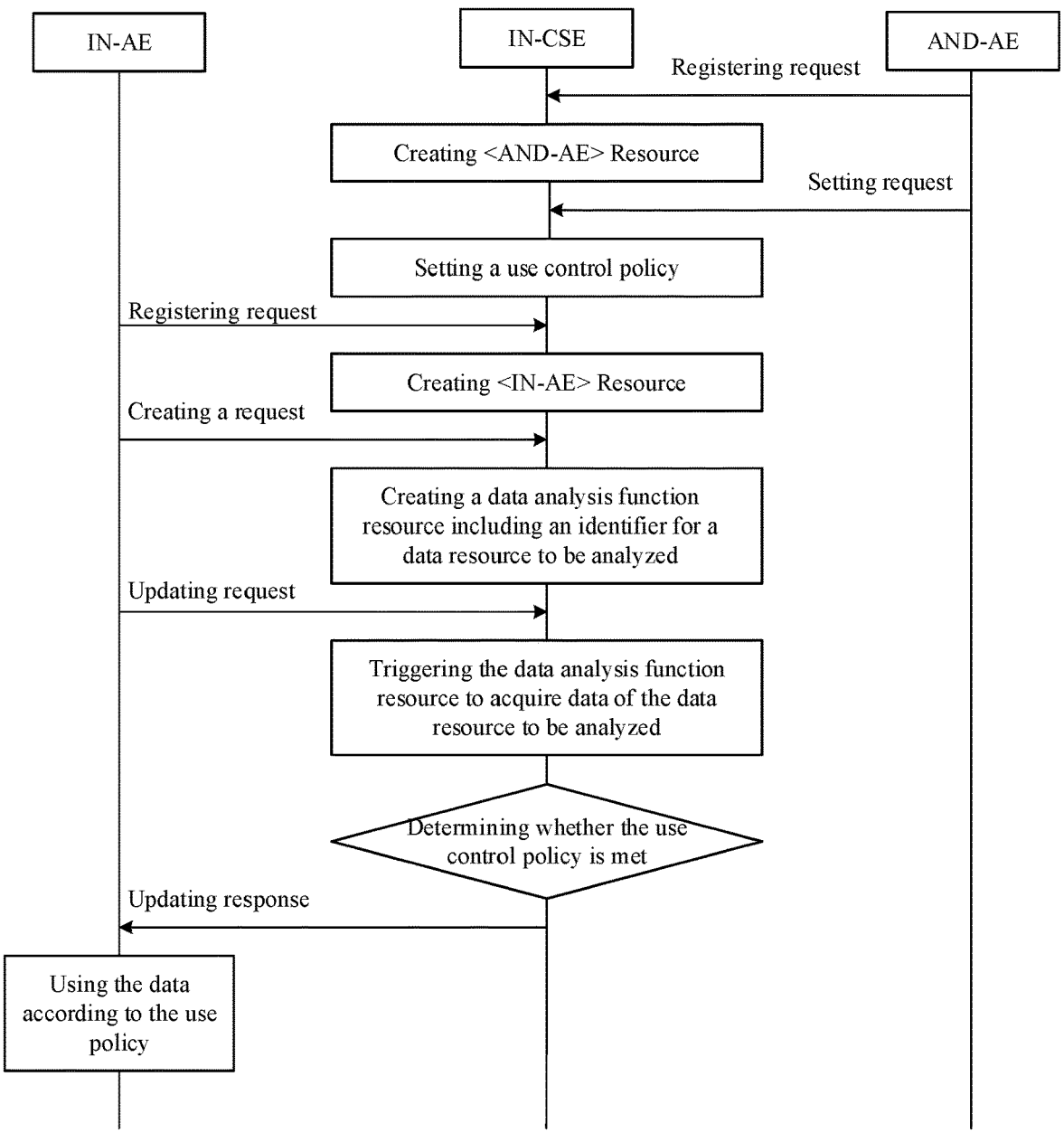
FIG. 9 illustrates a schematic interaction of a use control method according to an embodiment of the present application.
Figure 10:
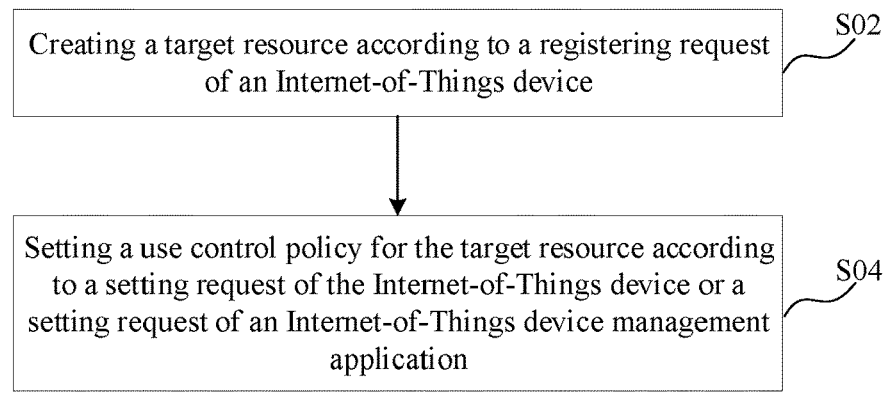
FIG. 10 illustrates another schematic flowchart of a use control method according to an embodiment of the present application.

Referring to FIGS. 9 and 10, in some embodiments, the data use control method includes:
a step S02 of creating a target resource according to a registering request of an Internet-of-Things device; and
a step S04 of setting a use control policy for the target resource according to a setting request of the Internet-of-Things device or a setting request of an Internet-of-Things device management application.

Specifically, the data use control system includes a creating module 14 and a setting module 15. The step S02 can be implemented by the creating module 14, and the step S04 can be implemented by the setting module 15. That is to say, the creating module 14 can be configured to create the target resource according to the registering request of the Internet-of-Things device, and the setting module 15 can be configured to set the use control policy for the target resource according to the setting request of the Internet-of-Things device or the setting request of the Internet-of-Things device management application.

It can be understood that the Internet-of-Things platform (as shown on a platform layer in FIG. 3) can include multiple functional modules, each of which performs specific service logic and can be represented through IN-AE (platform infrastructure node-application entity), and the Internet-of-Things platform includes multiple pieces of data. Some functional modules (for example, a data analysis functional module) may use data, and some functional modules (for example, a device upgrade functional module) may not use data.

The Internet-of-Things platform can be represented through common service entities. There can be a plurality of applications on the Internet-of-Things platform, and the applications can be represented through application entities. On the Internet-of-Things platform, the applications can implement their service logic through integrated functional modules. For example, in the embodiment shown in FIG. 3, an application 1 can include a functional module 1 and a functional module 2; an application 2 can include the functional module 2 and a functional module 3. In addition, some Internet-of-Things platforms provide an interface for accessing data directly. For example, an application 3 can directly invoke a data access interface provided by IN-CSE (infrastructure nodes—common service entities) without including functional modules.

In this way, when joining an Internet-of-Things platform, an Internet-of-Things device can first send a registering request to a common service entity, and the common service entity creates a corresponding target resource to manage data uploaded by the Internet-of-Things device. After the common service entity has created the target resource corresponding to the Internet-of-Things device, the Internet-of-Things device with a setting function can send a setting request to set a use control policy for the target resource. For an Internet-of-Things device without a setting function, a corresponding Internet-of-Things device management application can send a setting request to set a use control policy for the target resource. In this way, the system can protect utilization of data, which facilitates protection and utilization of data.

Figure 11:
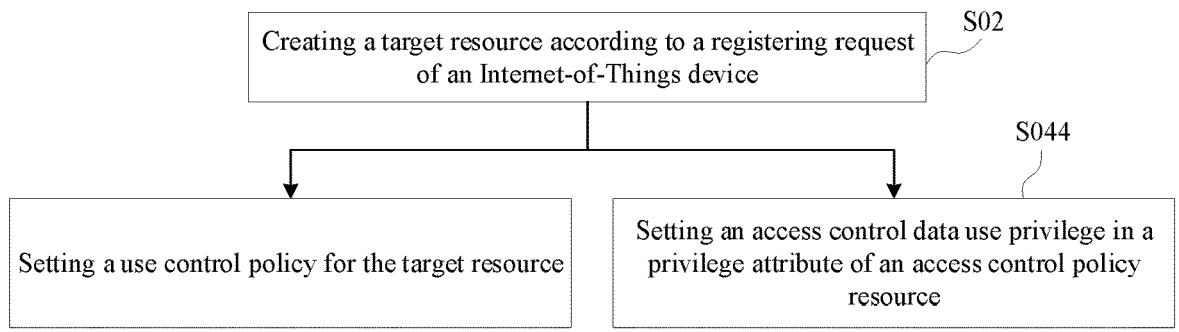
FIG. 11 illustrates further another schematic flowchart of a use control method according to an embodiment of the present application.

Referring to FIG. 11, in some embodiments, the step S04 includes:
- a step S042 of creating a use control policy resource corresponding to the target resource, where sub-attributes of the use control policy resource include one or more use control policy; or
- a step S044 of setting an access control data use privilege in a privilege attribute of an access control policy resource, where the access control data use privilege includes one or more use control policy.

Specifically, the step S042 and step S044 can be implemented by a setting module 15. That is to say, the setting module 15 can be configured to create the use control policy resource corresponding to the target resource according to the setting request of the Internet-of-Things device, where the sub-attributes of the use control policy resource include the one or more use control policy, or be configured to set the access control data use privilege in the privilege attribute of the access control policy resource, where the access control data use privilege includes the one or more use control policy.

Figure 12:
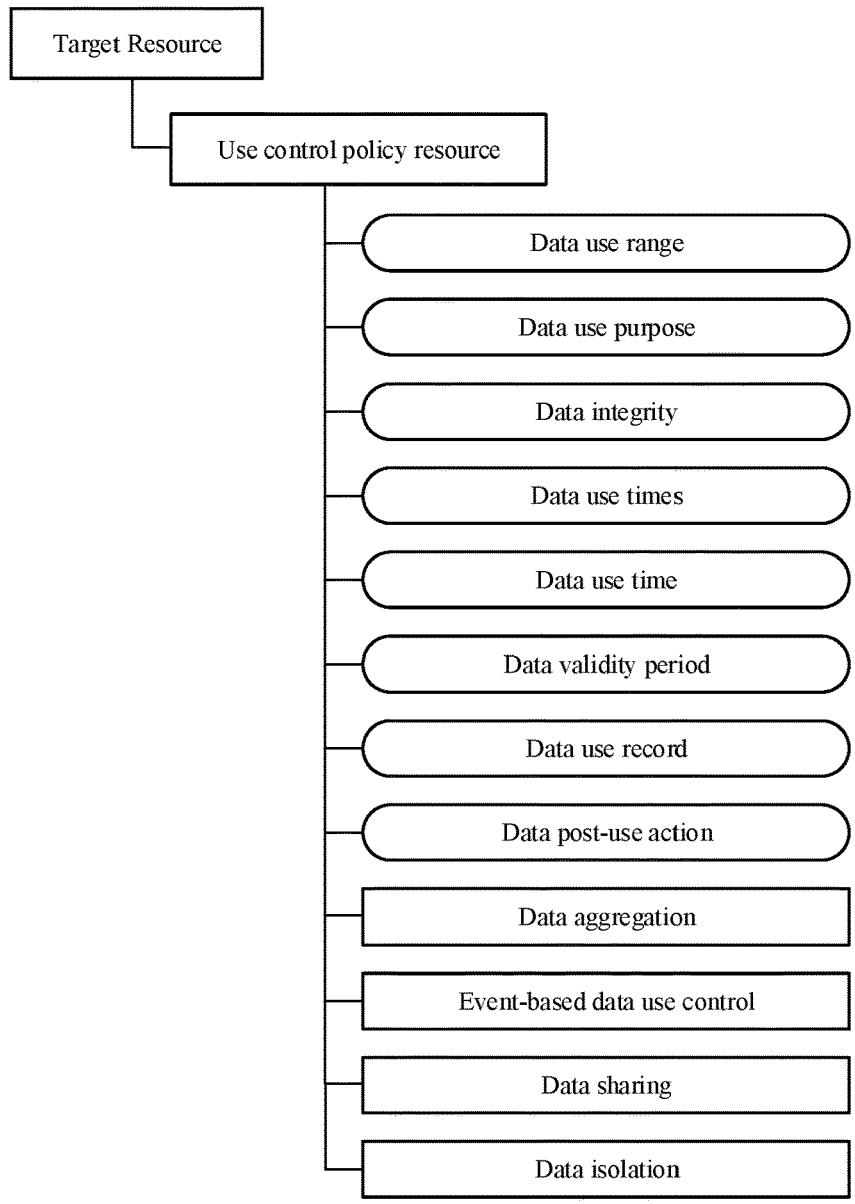
FIG. 12 illustrates a schematic structure of a use control policy resource according to an embodiment of the present application.
Figure 13:
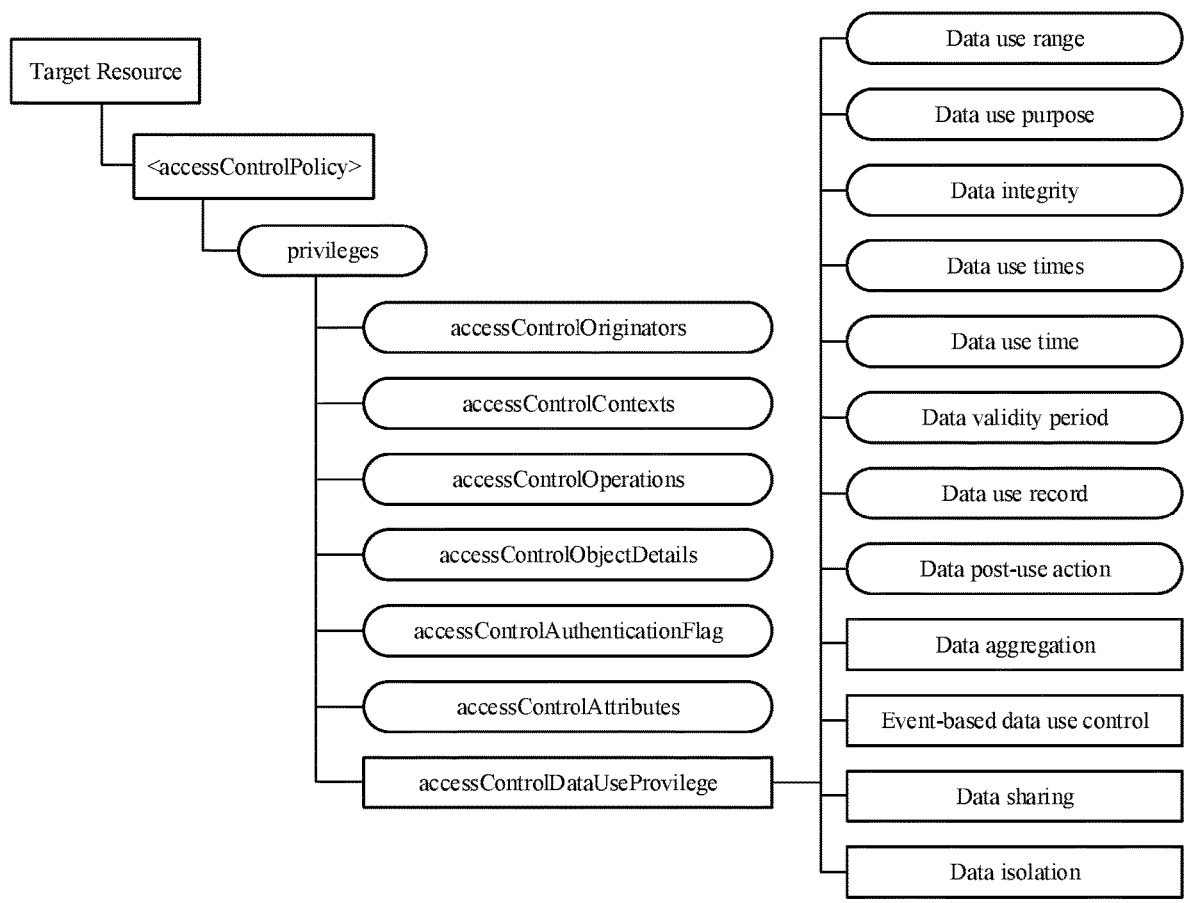
FIG. 13 illustrates a schematic structure of an access control policy resource according to an embodiment of the present application.

As shown in FIG. 12, in the step S042, a separate use policy resource can be created according to the setting request of the Internet-of-Things device, and a corresponding use control policy is set in the sub-attributes of the use policy resource, so as to realize a data use control function. As shown in FIG. 13, in the step S044, the access control policy resource corresponding to the target resource can be extended according to the setting request of the Internet-of-Things device, and the access control data use privilege can be set in sub-attributes of the privilege attribute of the access control policy resource, so as to set the corresponding use control policy in the access control data use privilege, and similarly, to realize the function for controlling data use.

Figure 14:
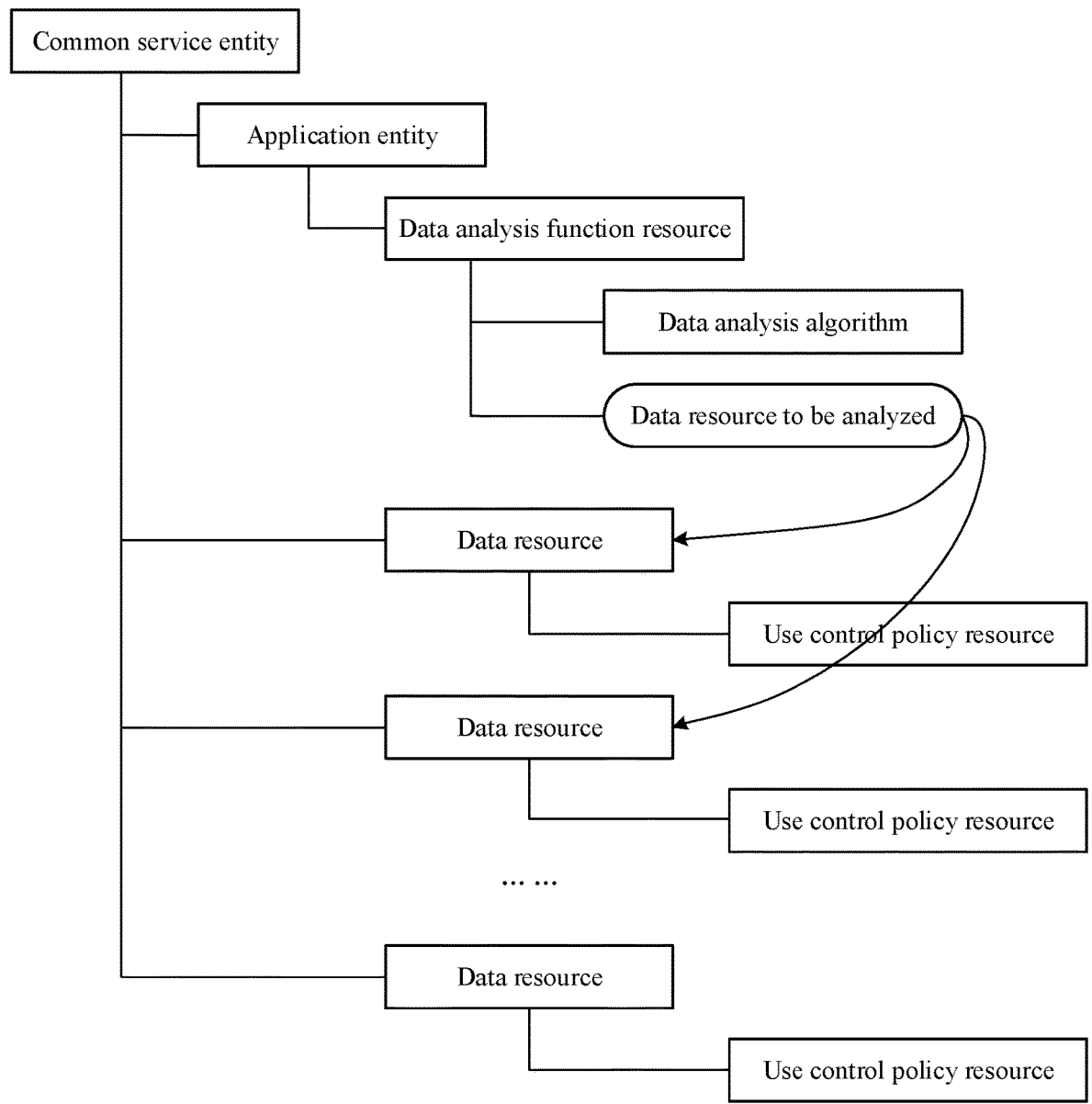
FIG. 14 illustrates a schematic structure of a common service entity according to an embodiment of the present application.
Figure 15:
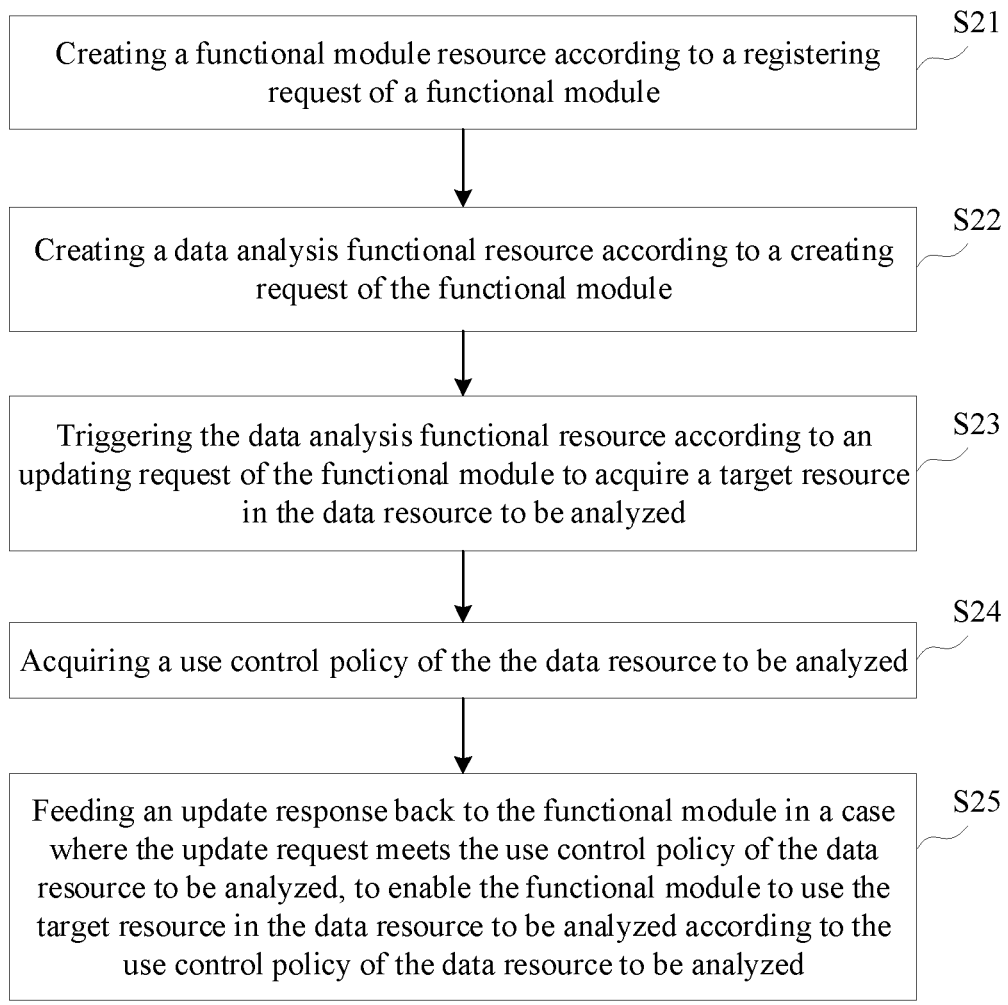
FIG. 15 illustrates another schematic flowchart of a use control method according to an embodiment of the present application.

Referring to FIGS. 9, 14 and 15, in some embodiments, the data use request includes an updating request, and the data use control method includes:
- a step S21 of creating a functional module resource according to a registering request of a functional module;
- a step S22 of creating a data analysis functional resource according to a creation request of the functional module, where the data analysis functional resource includes an identifier for a data resource to be analyzed;
- a step S23 of triggering the data analysis functional resource according to an updating request of the functional module to acquire a target resource in the data resource to be analyzed;
- a step S24 of acquiring a use control policy of the data resource to be analyzed; and
- a step S25 of feeding an update response back to the functional module in a case where the updating request meets the use control policy of the data resource to be analyzed, to enable the functional module to use the target resource in the data resource to be analyzed according to the use control policy of the data resource to be analyzed.

Specifically, the steps S21 and S22 can be implemented by the creating module 14, the steps S23 and S24 can be implemented by the acquiring module 12, and the step S25 can be implemented by the processing module 13. That is to say, the creating module 14 can be configured to create the functional module resource according to the registering request of the functional module, and create the data analysis functional resource according to the creation request of the functional module, where the data analysis functional resource includes the identifier for the data resource to be analyzed, the acquiring module 12 can be configured to trigger the data analysis functional resource according to the updating request of the functional module to acquire the target resource in the data resource to be analyzed, and acquire the use control policy of the data resource to be analyzed, and the processing module 13 can be configured to, in a case where the updating request meets the use control policy of the data resource to be analyzed, feed the update response back to the functional module to enable the functional module to use the target resource in the data resource to be analyzed according to the use control policy of the data resource to be analyzed.

In this way, for analytical applications, data from the data resource to be analyzed can be analyzed by invoking the data analysis functional module, so as to realize utilization of data.

Figure 16:
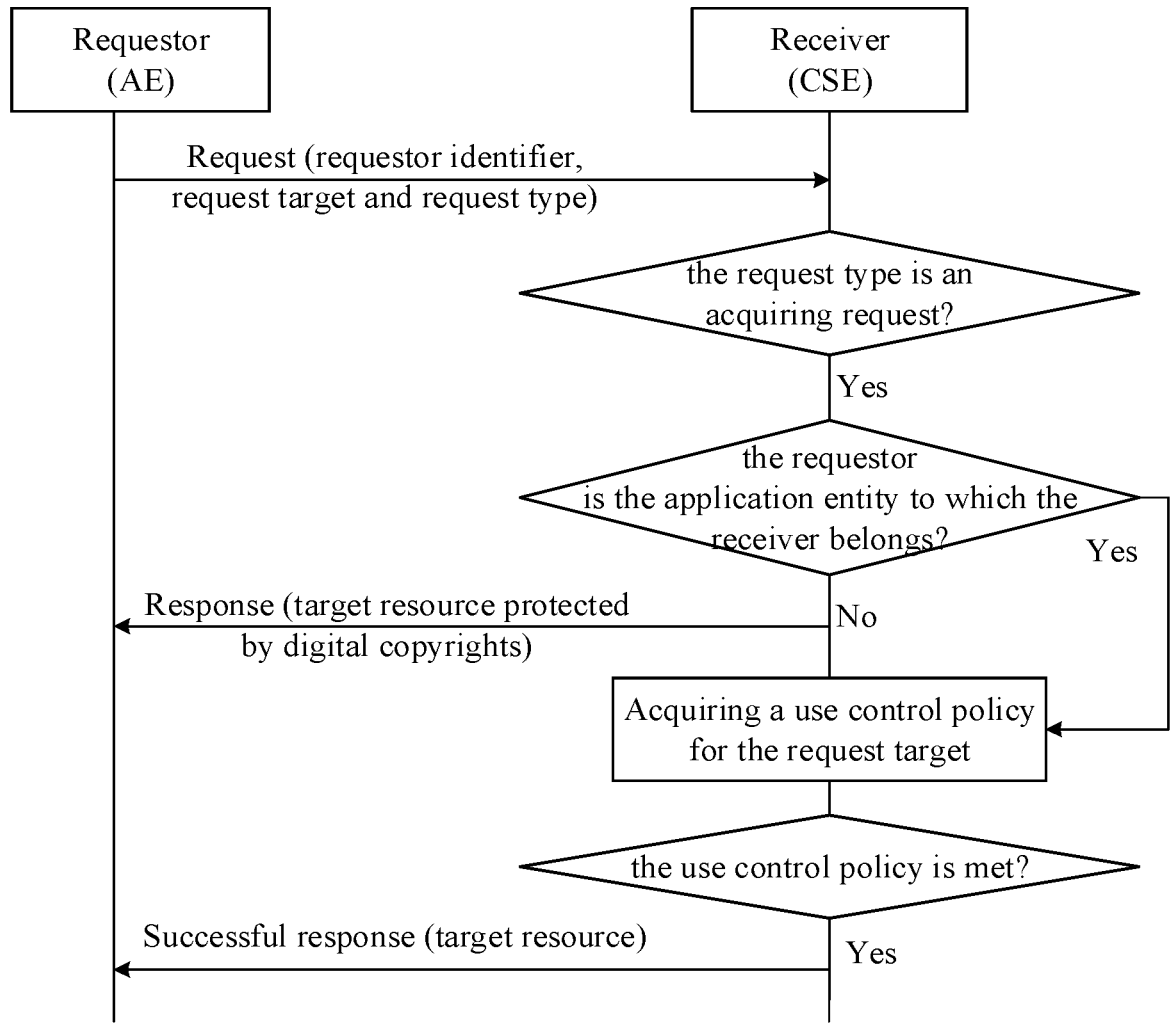
FIG. 16 illustrates another schematic interaction of a use control method according to an embodiment of the present application.
Figure 17:
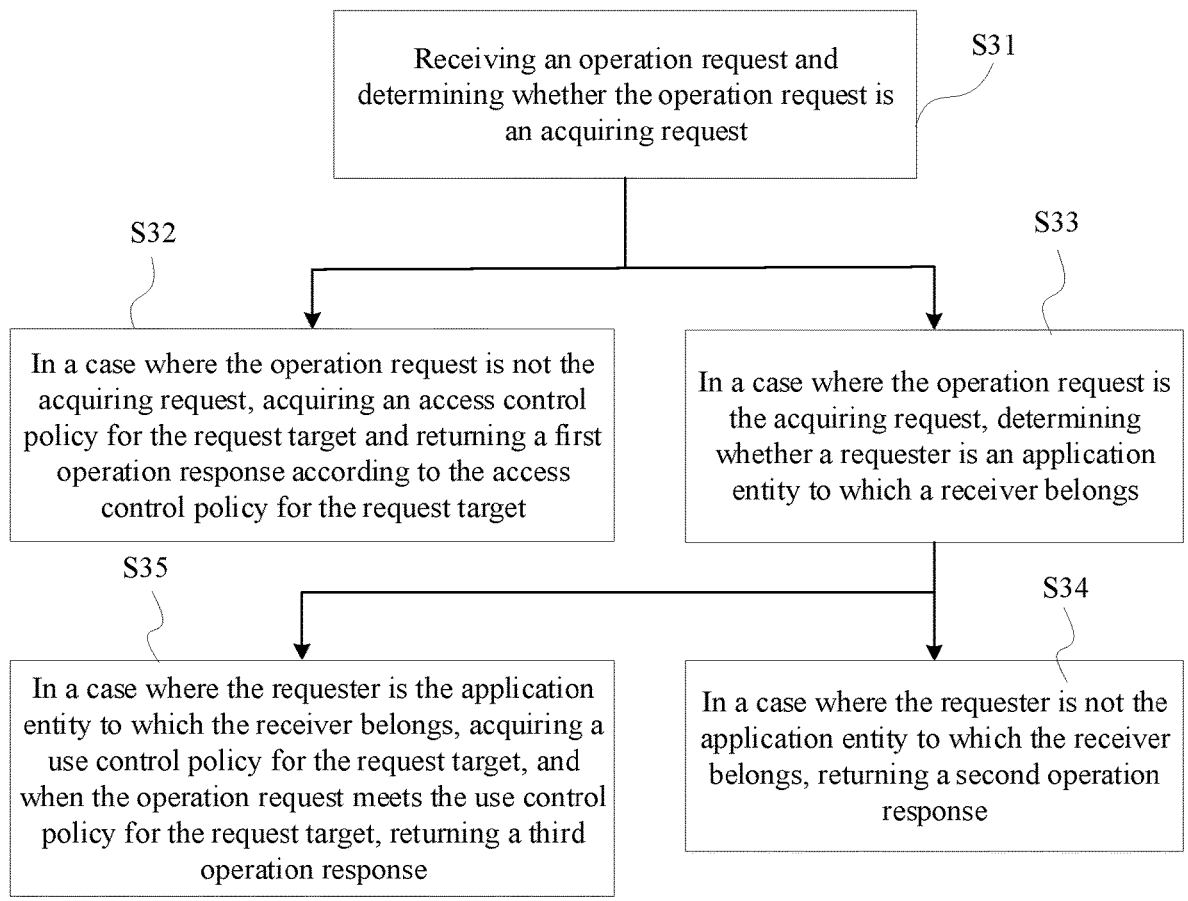
FIG. 17 illustrates another schematic flowchart of a use control method according to an embodiment of the present application.

Referring to FIGS. 16 and 17, in some embodiments, the data use request includes an operation request, and the data use control method includes:
- a step S31 of receiving the operation request and determining whether the operation request is an acquiring request, where the operation request includes a requester identifier, a request target and a request type;
- a step S32, in a case where the operation request is not the acquiring request, acquiring an access control policy corresponding to the request target and returning a first operation response according to the access control policy corresponding to the request target.

Specifically, the step S31 can be implemented by the receiving module 11, and the step S32 can be implemented by the acquiring module 12 and the processing module 13. That is to say, the receiving module 11 can be configured to receive the operation request and determine whether the operation request is the acquiring request. The acquiring module 12 can be configured to, in a case where the operation request is not the acquiring request, acquire the access control policy corresponding to the request target. The processing module 13 can be configured to return the first operation response according to the access control policy corresponding to the request target.

It can be understood that a requester can be an application of the Internet of Things platform, and a receiver can be the Internet of Things platform. For an application that can directly invoke the data access interface to acquire data from the common service entity, a use control policy is executed with regard to a specific type of request operation. When the operation request is not the acquiring request, the requester does not need to acquire the data of the target resource, nor does it need to control the use of the data. Therefore, the request type can be determined. For the operation request that does not belong to the acquiring request, access control is performed according to a corresponding access control policy. It can be understood that, in a case where the operation request meets the access control policy, contents being accessed can be sent to the requester by returning the first operation response; and in a case where the operation request does not meet the access control policy, the requester can be rejected to access by returning the first operation response.

Further, in some embodiments, the data use control method includes:
- a step S33 of, in a case where the operation request is the acquiring request, determining whether a requester is an application entity to which a receiver belongs;
- a step S34 of, in a case where the requester is not the application entity to which the receiver belongs, returning a second operation response which includes a target resource protected by digital copyrights; and
- a step S35 of, in a case where the requester is the application entity to which the receiver belongs, acquiring a use control policy corresponding to the request target, and when the operation request meets the use control policy corresponding to the request target, returning a third operation response which includes a target resource corresponding to the request target.

Specifically, the step S33 can be implemented by the receiving module 11, the step S34 can be implemented by the processing module 13, and the step S35 can be implemented by the acquiring module 12 and the processing module 13. Specifically, the receiving module 11 can be configured to, in a case where the operation request is the acquiring request, determine whether the requester is the application entity to which the receiver belongs. The processing module 13 can be configured to, in a case where the requester is not the application entity to which the receiver belongs, return the second operation response. The acquiring module 12 can be configured to, in a case where the requester is the application entity to which the receiver belongs, acquire the use control policy corresponding to the request target, and the processing module 13 can be configured to, when the operation request meets the use control policy corresponding to the request target, return the third operation response.

In this way, it is determined whether the requester is from inside the platform through the use control policy. For applications or functional modules inside the platform, the third operation response is returned, so as to return initial data corresponding to the target resource. For applications outside the platform, the second operation response is returned, so as to return data contents protected by digital copyrights.

Figure 18:
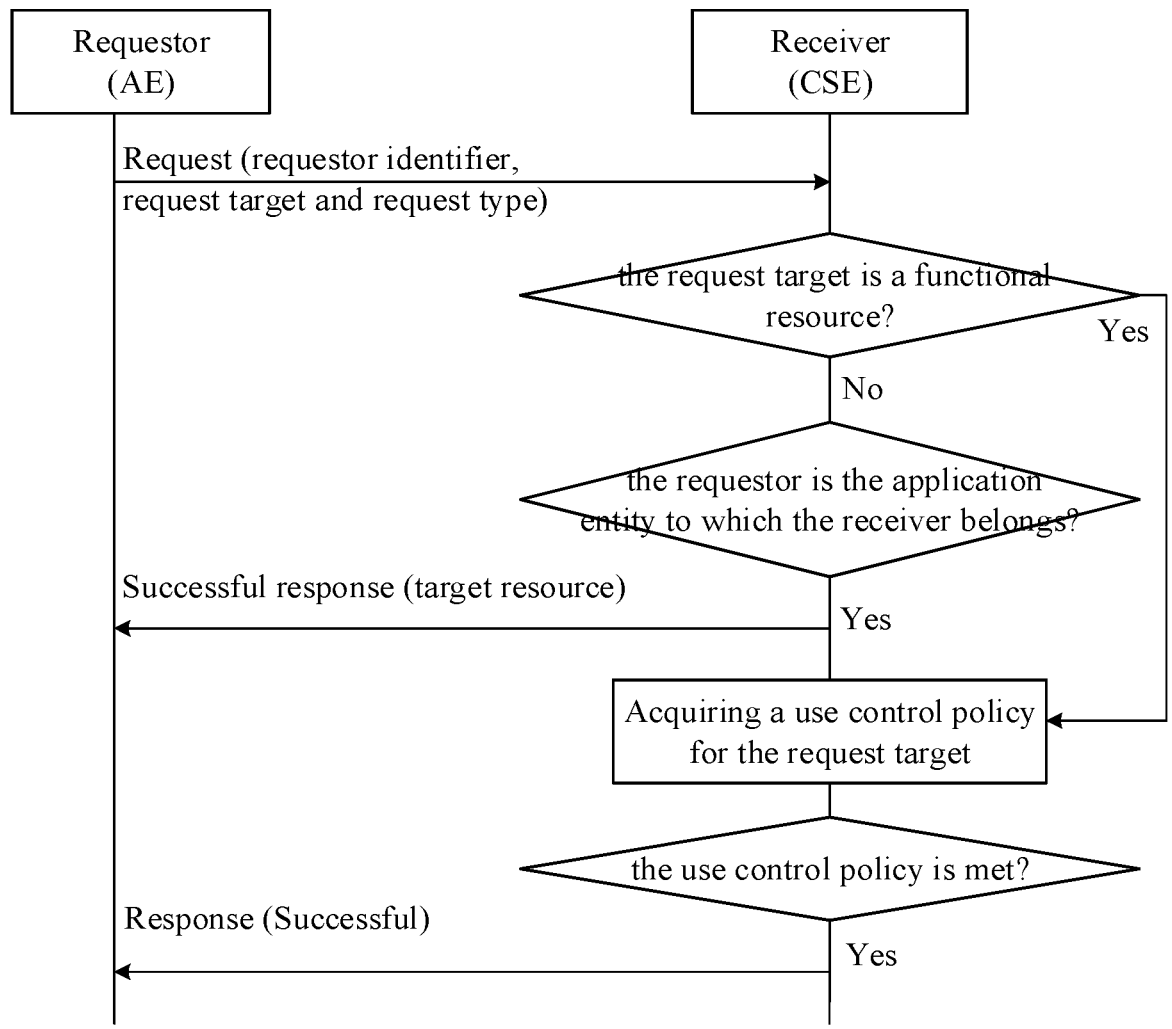
FIG. 18 illustrates further another schematic interaction of a use control method according to an embodiment of the present application.
Figure 19:
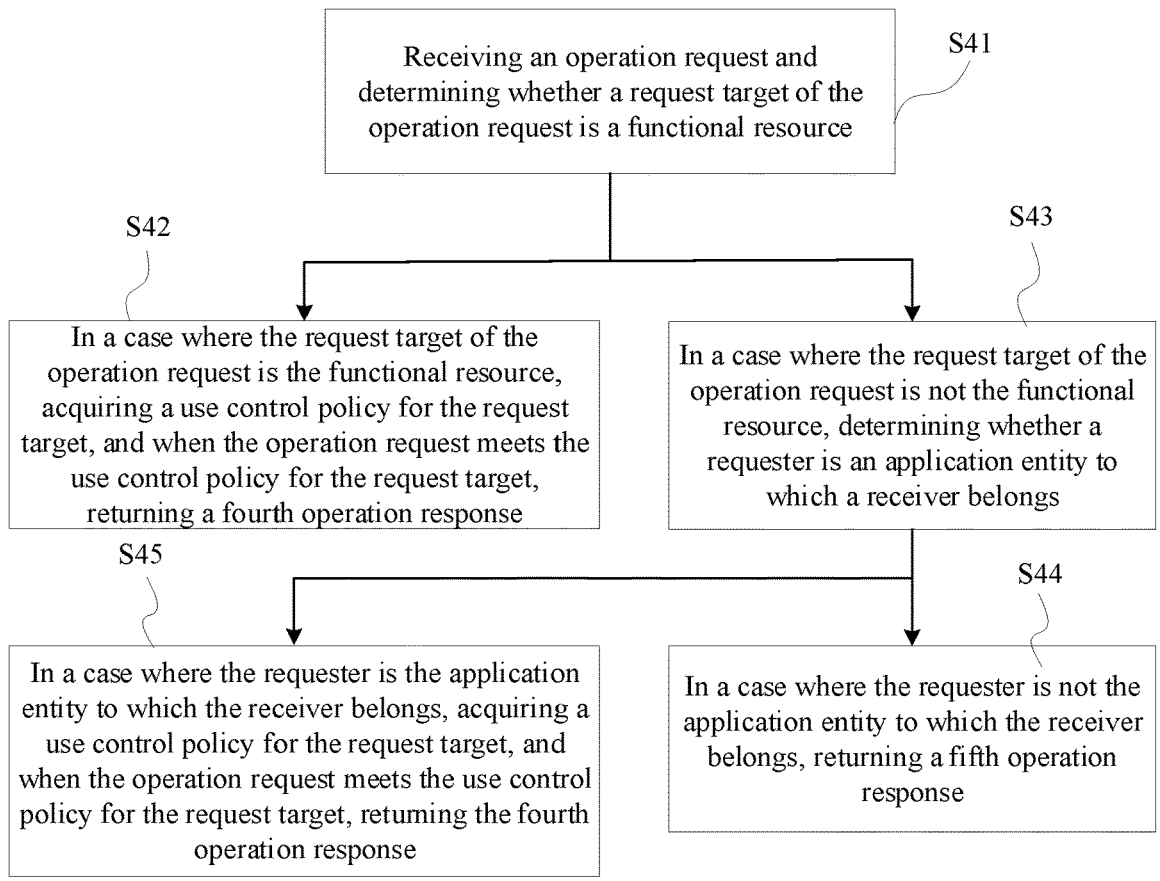
FIG. 19 illustrates further another schematic flowchart of a use control method according to an embodiment of the present application.

Referring to FIGS. 18 and 19, in some embodiments, the data use request includes an operation request, and the data use control method includes:
- a step S41 of receiving the operation request and determining whether a request target of the operation request is a functional resource, where the operation request includes a requester identifier, the request target and a request type; and
- a step S42 of, in a case where the request target of the operation request is the functional resource, acquiring a use control policy corresponding to the request target, and when the operation request meets the use control policy corresponding to the request target, returning a fourth operation response which includes a target resource corresponding to the request target.

Specifically, the step S41 can be implemented by the receiving module 11, and the step S42 can be implemented by the acquiring module 12 and the processing module 13. That is to say, the receiving module 11 can be configured to receive the operation request and determine whether the request target of the operation request is the functional resource. The acquiring module 12 can be configured to, in a case where the request target of the operation request is the functional resource, acquire the use control policy corresponding to the request target, and the processing module 13 can be configured to, when the operation request meets the use control policy corresponding to the request target, return the fourth operation response.

It can be understood that the Internet of Things platform can be based on a Restful architecture, the Internet of Things platform is represented by the common service entity, the Internet of Things platform and its capabilities are represented by resources, an application of the Internet of Things platform is represented by the application entity, and data is represented through the target resource. At this time, the requester can be an application of the Internet of Things platform, and the receiver can be the Internet of Things platform. For applications that use functional modules to access data, all functions of the platform can be represented by resources. When the request target from the requester is a functional resource, a data use control policy is invoked. In this way, by classifying the target resources, when the target resource belongs to a data use resource, a use control policy is invoked, and when the use control policy is met, the fourth operation response is returned, so as to return the functional resource to realize controlling the use of the data of the target resource.

In some embodiments, the data use control method includes:
- a step S43 of, in a case where the request target of the operation request is not the functional resource, determining whether a requester is an application entity to which a receiver belongs;
- a step S44 of, in a case where the requester is not the application entity to which the receiver belongs, returning a fifth operation response which includes a target resource protected by digital copyrights; and
- a step S45 of, in a case where the requester is the application entity to which the receiver belongs, acquiring a use control policy corresponding to the request target, and when the operation request meets the use control policy corresponding to the request target, returning the fourth operation response.

Specifically, the step S43 can be implemented by the receiving module 11, the step S44 can be implemented by the processing module 13, and the step S45 can be implemented by the acquiring module 12 and the processing module 13. That is to say, the receiving module 11 can be configured to, in a case where the request target of the operation request is not the functional resource, determine whether the requester is the application entity to which the receiver belongs. The processing module 13 can be configured to, in a case where the requester is not the application entity to which the receiver belongs, return the fifth operation response. The acquiring module 12 can be configured to, in a case where the requester is the application entity to which the receiver belongs, acquire the use control policy corresponding to the request target, and the processing module 13 can be configured to, when the operation request meets the use control policy corresponding to the request target, return the fourth operation response.

For a non-functional resource, it can be further determined whether the requester is from inside the platform. For applications or functional modules inside the platform, the fourth operation response is returned, so as to return initial data corresponding to the target resource. For applications outside the platform, the fifth operation response is returned, so as to return data contents protected by digital copyrights.

Figure 20:
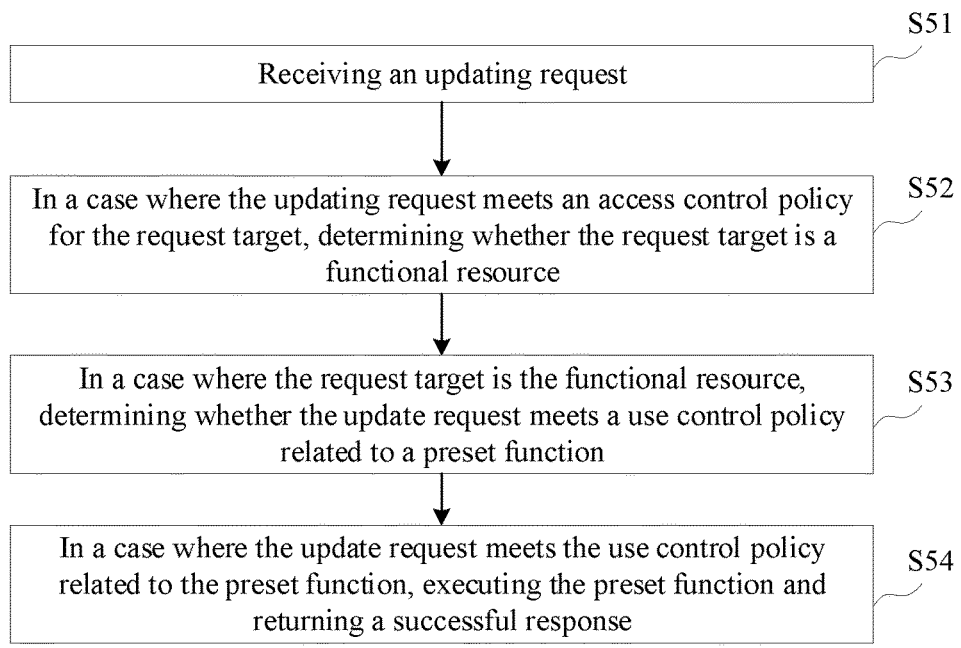
FIG. 20 illustrates a schematic flowchart of a common service entity according to an embodiment of the present application.

Referring to FIG. 20, in some embodiments, the data use request includes an updating request, and the data use control method includes:
- a step S51 of receiving the updating request which includes a requester identifier, a request target and a data aggregation functional resource to which the request target points;
- a step S52 of, in a case where the updating request meets an access control policy corresponding to the request target, determining whether the request target is a functional resource;
- a step S53 of, in a case where the request target is the functional resource, determining whether the updating request meets a use control policy related to a preset function; and
- a step S54 of, in a case where the updating request meets the use control policy related to the preset function, executing the preset function and returning a successful response.

Specifically, the step S51, the step S52 and the step S53 can be implemented by the receiving module 11, and the step S54 can be implemented by the processing module 13. That is to say, the receiving module 11 can be configured to receive the updating request, in a case where the updating request meets the access control policy corresponding to the request target, determine whether the request target is the functional resource, and in a case where the request target is the functional resource, determine whether the updating request meets the use control policy related to the preset function, and the processing module 13 can be configured to, in a case where the updating request meets the use control policy related to the preset function, execute the preset function and return the successful response.

The preset function includes, but is not limited to, a data aggregation function, a data isolation function, an event-based data use and/or a data disuse function.

Figure 21:
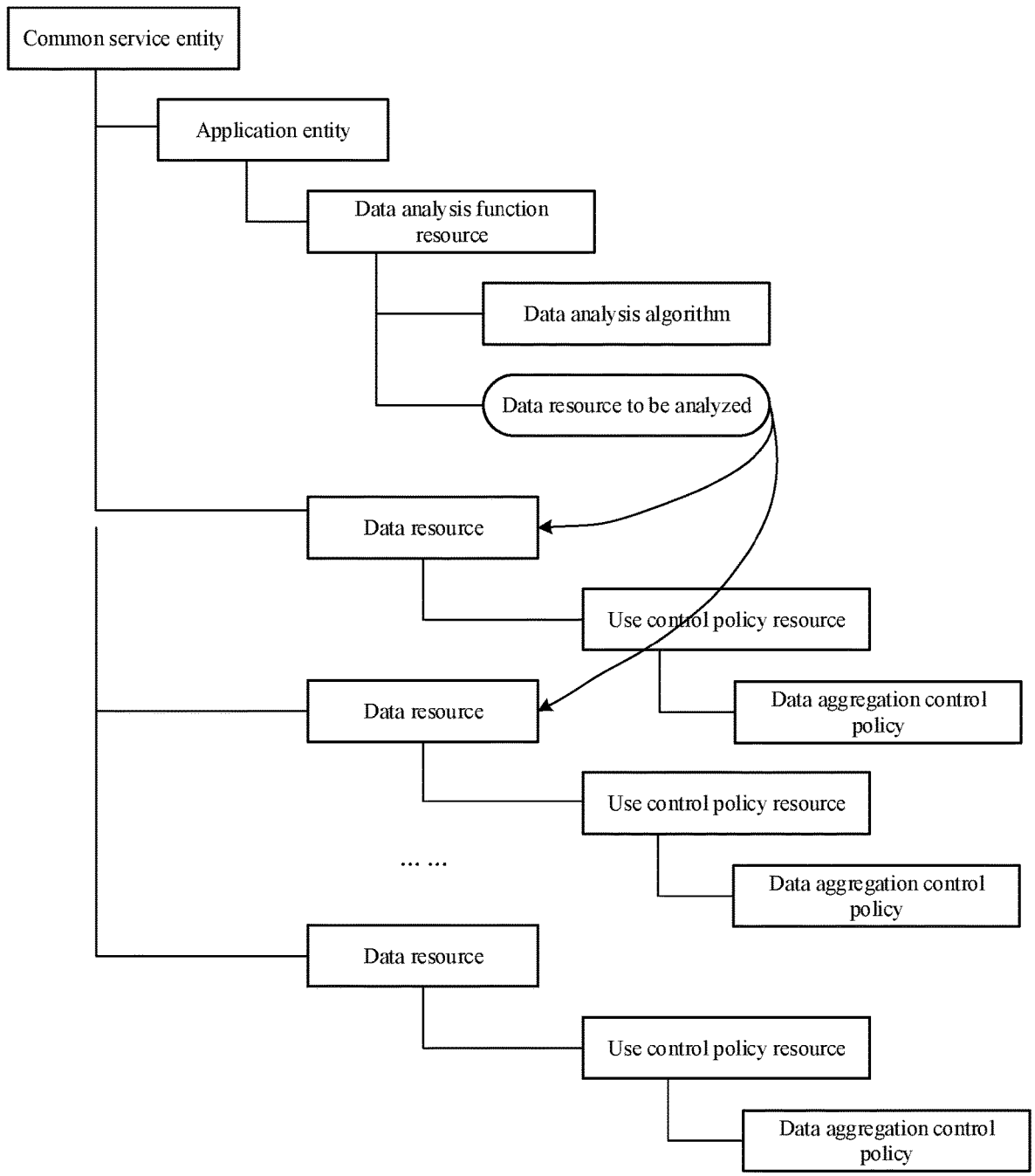
FIG. 21 illustrates a schematic structure of a use control method according to an embodiment of the present application.
Figure 22:
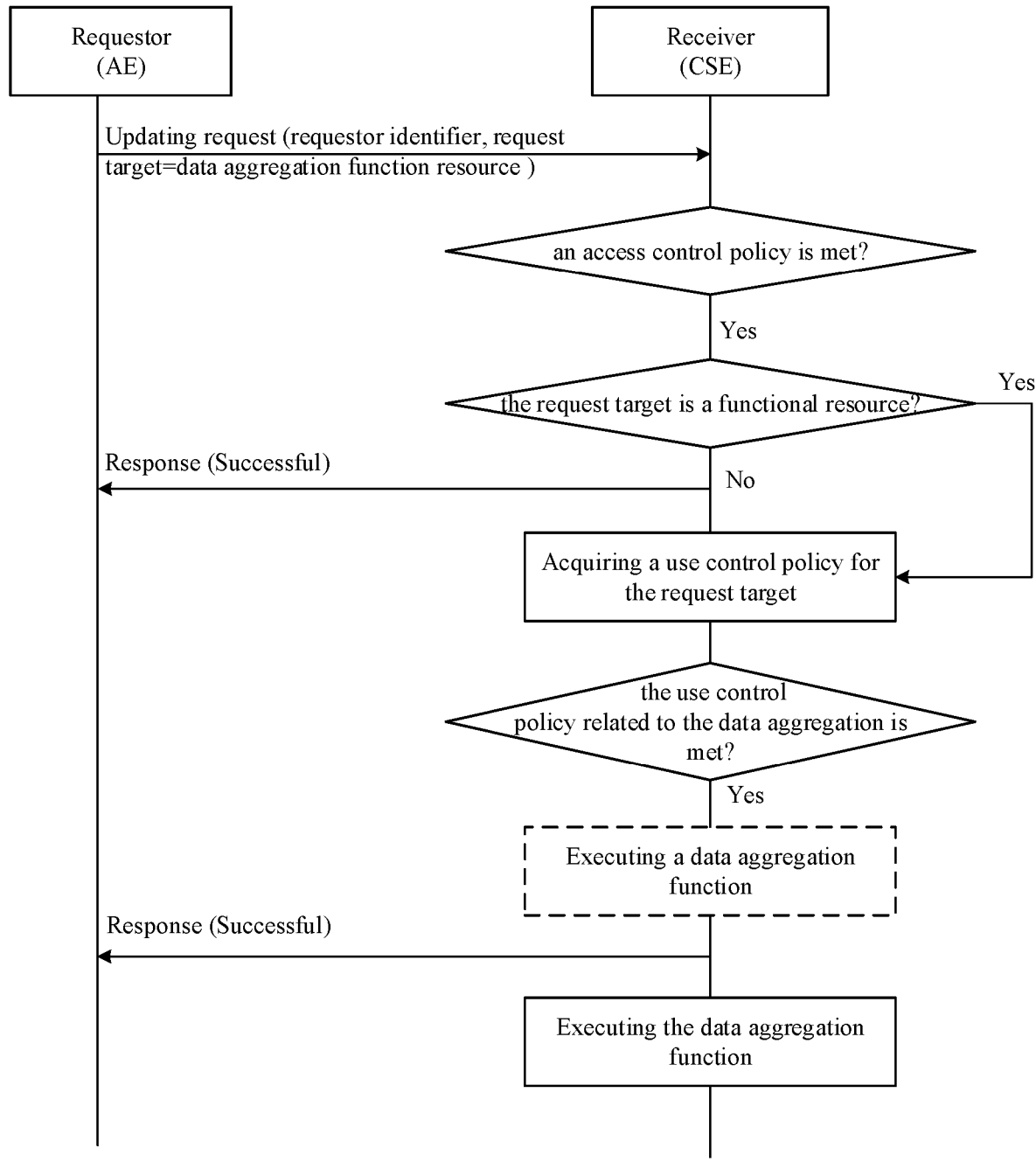
FIG. 22 illustrates another schematic interaction of a use control method according to an embodiment of the present application.

As shown in FIGS. 21 and 22, in an example, the preset function is the data aggregation function. In this way, the requester can be an application of the Internet of Things platform, and the receiver can be the Internet of Things platform. By means of the access control policy, the resource classification and the use control policy, the data aggregation function can be realized, and untrusted applications cannot analyze data of a single user, such that the privacy of the user is protected.

In some embodiments, the step S53 includes: determining whether the data to be analyzed meets a data aggregation control policy defined by each data resource.

Specifically, the receiving module 11 can be configured to determine whether the data to be analyzed meets a data aggregation control policy defined by each data resource.

It can be understood that, after the data aggregation switch turns on, it needs to be determined whether the data to be analyzed specified in a data aggregation functional module meets the data aggregation control policy defined by each data resource. When attributes of the data to be analyzed include only a data resource 1, and a data aggregation control policy switch defined by the data resource 1 turns on, the data aggregation functional resource does not meet the data use policy, thus the request is rejected. When attributes of the data to be analyzed include only the data resource 1 and a data resource 2, a data aggregation control policy switch defined by each data resource turns on, and the data aggregation functional resource meets the data use policy, it needs to be further determined whether other parameters of the data aggregation function meet contents of the data aggregation control policy.

In some embodiments, the data use control method includes: before executing the data aggregation function, determining whether the updating request meets event notification rules.

Specifically, the receiving module 11 can be configured to, before executing the data aggregation function, determining whether the updating request meets the event notification rules.

Figure 23:
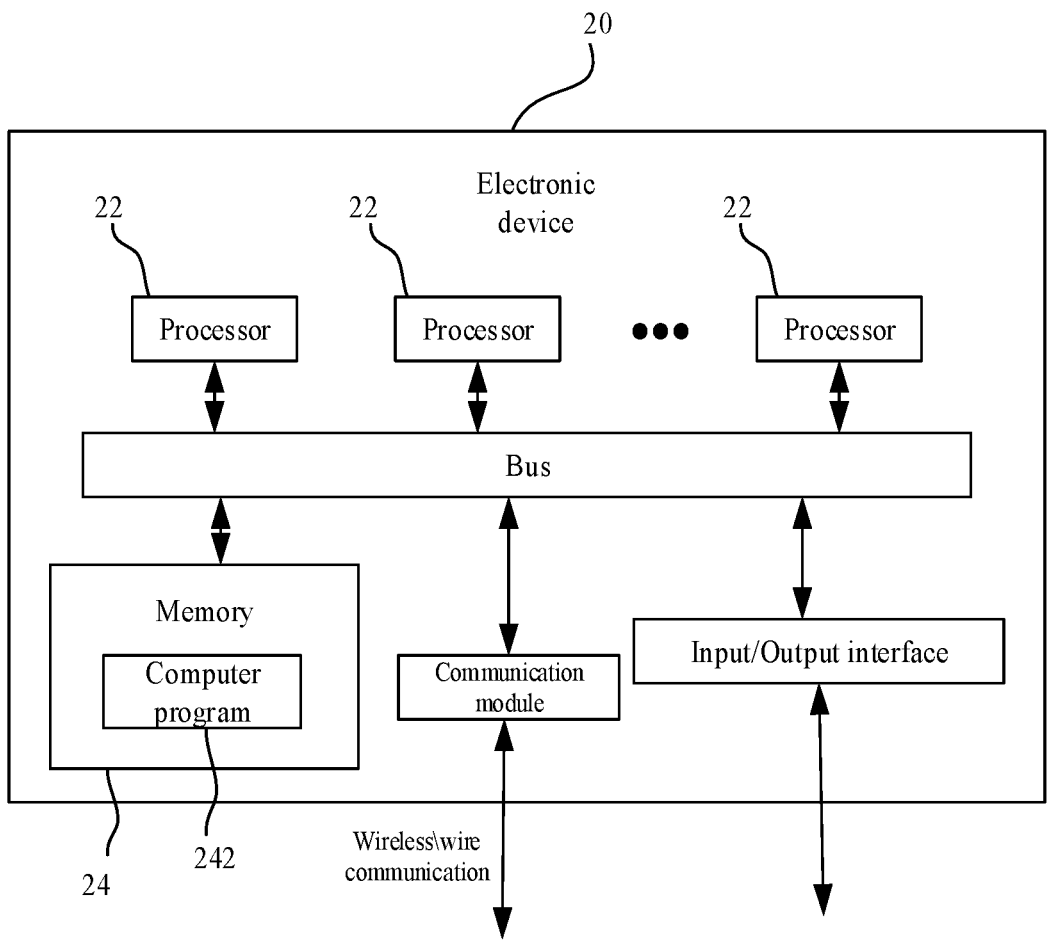
FIG. 23 illustrates a schematic modular diagram of an electronic device according to an embodiment of the present application.

Referring to FIG. 23, in the embodiments of the present application, there is provided an electronic device, including processors and a memory, where the memory stores a computer program which is executed by one or more of the processors to implement the data use control method according to any one of the embodiments.

In an example, the computer program is executed by the processors to perform the following steps:
- a step S12 of receiving a data use request which includes a target resource to be used;
- a step S14 of acquiring a use control policy of the target resource; and
- a step S16 of using the target resource according to the use control policy of the target resource.

In the electronic device according to the embodiments of the present application, the computer program is executed by the processor to implement: by setting the use control policy for the target resource, after receiving the data use request, acquiring the use control policy for the target resource, so as to use the target resource according to the use control policy. In this way, the system can protect utilization of data, which facilitates protection and utilization of data.

Figure 24:
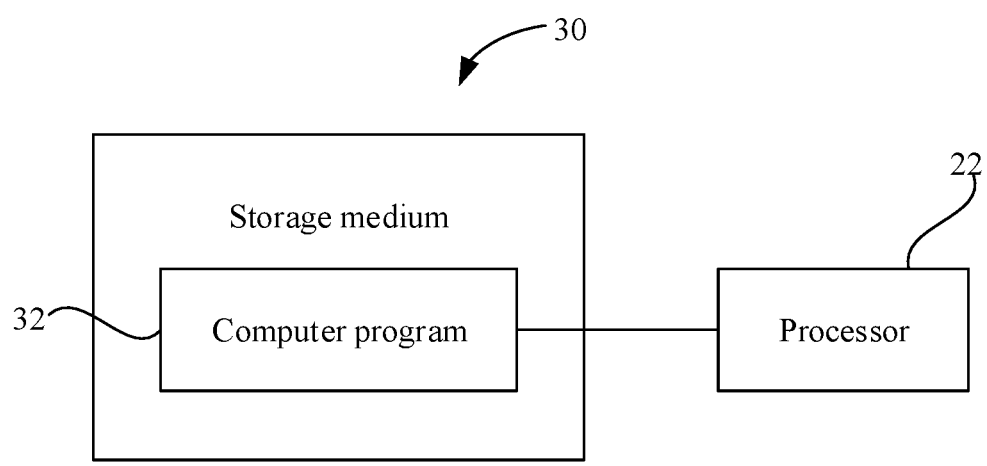
FIG. 24 illustrates a schematic modular diagram of a storage medium according to an embodiment of the present application.

Referring to FIG. 24, in the embodiments of the present application, there is provided a storage medium storing a computer program therein, where the computer program is executed by one or more processors to implement the data use control method according to any one of the embodiments.

Those skilled in the art can understand that all or part of the steps carried in the above method according to the embodiments can be achieved by instructing relevant hardware through a program. The program can be stored in a computer readable storage medium. When the program is executed, one of the steps in the method according to the embodiments or a combination thereof is performed.

In addition, all functional units in the embodiments of the present application may be integrated into one processing module, or each unit may be present alone physically, or two or more units may be integrated into one module. The above integrated module can be implemented in a form of either hardware or software functional modules. If the integrated modules are implemented in the form of software functional modules, and is sold or used as an independent product, it can be stored in a computer readable storage medium. The storage medium mentioned above can be a read-only memory, a magnetic or optical disk, etc.

Although the embodiments of the present application have been shown and described above, it can be understood that the above embodiments are illustrative and cannot be explained as a limitation on the present application. Those skilled in the art can change, modify, replace and vary the above embodiments within the scope of the present application.

The invention claimed is:

1. A method for controlling conditions of using data on an Internet-of-Things platform, wherein the Internet-of-Things platform centrally manages various Internet-of-Things devices and provides an interface for an Internet-of-Things application to access data of the Internet-of-Things devices and control the Internet-of-Things devices through the Internet-of-Things platform, the method comprises:
  receiving a data use request from the Internet-of-Things application, wherein the data use request comprises a target resource to be used for managing data uploaded by one of the Internet-of-Things devices;
  acquiring a use control policy of the target resource; and
  controlling the Internet-of-Things application to use the target resource according to the use control policy,
  wherein the method further comprises:
  creating the target resource according to a registration request of an Internet-of-Things device; and
  setting the use control policy for the target resource according to a setting request of the Internet-of-Things device or a setting request of an Internet-of-Things device management application,
  wherein the data use request comprises an operation request, and the method further comprises:
  receiving the operation request and determining whether a request target of the operation request is a functional resource, wherein the operation request comprises a requester identifier, the request target and a request type;
  upon determination that the request target of the operation request is the functional resource, acquiring a use control policy corresponding to the request target, and when the operation request meets the use control policy corresponding to the request target, returning a first operation response which comprises a target resource corresponding to the request target;
  upon determination that the request target of the operation request is not the functional resource, determining whether a requester is an application entity to which a receiver belongs;
  upon determination that the requester is not the application entity to which the receiver belongs, returning a second operation response which comprises a target resource protected by digital copyrights; and
  upon determination that the requester is the application entity to which the receiver belongs, acquiring a use control policy corresponding to the request target, and when the operation request meets the use control policy corresponding to the request target, returning the first operation response.

2. The method according to claim 1, wherein the use control policy comprises data use range, data use purpose, data integrity, data use times, data use time, data validity period, data anonymity, data aggregation, data isolation, event-based data use control, data use record, data post-use action and data sharing or any combination thereof.

3. The method according to claim 1, wherein setting the use control policy for the target resource comprises:
  creating a use control policy resource corresponding to the target resource, wherein the use control policy resource comprises the use control policy; or
  setting an access control data use privilege in a privilege attribute of an access control policy resource of the target resource, wherein the access control data use privilege comprises the use control policy.

4. The method according to claim 1, wherein the data use request comprises an updating request, and the method further comprises:
  creating a data analysis functional resource according to a creation request of a functional module, wherein the data analysis functional resource comprises an identifier for a data resource to be analyzed;
  triggering the data analysis functional resource according to the updating request of the functional module to acquire the target resource in the data resource to be analyzed;
  acquiring a use control policy of the data resource to be analyzed; and
  upon determination that the updating request meets the use control policy of the data resource to be analyzed, feeding an update response back to the functional module, thereby enabling the functional module to use the target resource in the data resource to be analyzed according to the use control policy of the data resource to be analyzed.

5. The method according to claim 1, further comprising:
  receiving the operation request and determining whether the operation request is an acquiring request; and
  upon determination that the operation request is not the acquiring request, acquiring an access control policy corresponding to the request target and returning a third operation response according to the access control policy corresponding to the request target.

6. The method according to claim 5, further comprising:
  upon determination that the operation request is the acquiring request, determining whether the requester is the application entity to which the receiver belongs;
  upon determination that the requester is not the application entity to which the receiver belongs, returning the second operation response; and
  upon determination that the requester is the application entity to which the receiver belongs, acquiring the use control policy corresponding to the request target, and when the operation request meets the use control policy corresponding to the request target, returning the first operation response.

7. The method according to claim 1, wherein the data use request comprises an updating request, the updating request comprising a requester identifier, a request target and a data aggregation functional resource to which the request target directs, and wherein the method further comprises:
  receiving the updating request;
  upon determination that the updating request meets an access control policy corresponding to the request target, determining whether the request target is a functional resource;

upon determination that the request target is the functional resource, determining whether the updating request meets a use control policy related to a preset function; and upon determination that the updating request meets the use control policy related to the preset function, executing the preset function and returning a successful response, wherein the preset function comprises a data aggregation function, a data isolation function, an event-based data use function and/or a data disuse function.

8. The method according to claim 7, wherein determining whether the updating request meets the use control policy related to the preset function comprises:

determining whether data to be analyzed meets a data aggregation control policy defined by each of data resources.

9. The method according to claim 7, further comprising:

before executing the data aggregation function, determining whether the updating request meets event notification rules.

10. An electronic device comprising one or more processors and a memory, wherein the electronic device is for controlling conditions of using data on an Internet-of-Things platform, the Internet-of-Things platform centrally manages various Internet-of-Things devices and provides an interface for an Internet-of-Things application to access data of the Internet-of-Things devices and thus control the Internet-of-Things devices through the Internet-of-Things platform, the memory stores a computer program, and the computer program is executed by the one or more processors to implement:

receiving a data use request from the Internet-of-Things application, wherein the data use request comprises a target resource to be used for managing data uploaded by one of the Internet-of-Things devices;

acquiring a use control policy of the target resource; and controlling the Internet-of-Things application to use the target resource according to the use control policy, wherein the computer program is executed by the one or more processors to further implement:

creating the target resource according to a registration request of the Internet-of-Things device; and setting the use control policy for the target resource according to a setting request of the Internet-of-Things device or a setting request of an Internet-of-Things device management application, wherein the data use request comprises an operation request, and the computer program is executed by the one or more processors to further implement:

receiving the operation request and determining whether a request target of the operation request is a functional resource, wherein the operation request comprises a requester identifier, the request target and a request type;

upon determination that the request target of the operation request is the functional resource, acquiring a use control policy corresponding to the request target, and when the operation request meets the use control policy corresponding to the request target, returning a first operation response which comprises a target resource corresponding to the request target;

upon determination that the request target of the operation request is not the functional resource, determining whether a requester is an application entity to which a receiver belongs;

upon determination that the requester is not the application entity to which the receiver belongs, returning a second operation response which comprises a target resource protected by digital copyrights; and upon determination that the requester is the application entity to which the receiver belongs, acquiring a use control policy corresponding to the request target, and when the operation request meets the use control policy corresponding to the request target, returning the first operation response.

11. The electronic device according to claim 10, wherein the use control policy comprises data use range, data use purpose, data integrity, data use times, data use time, data validity period, data anonymity, data aggregation, data isolation, event-based data use control, data use record, data post-use action, data sharing or any combination thereof.

12. The electronic device according to claim 10, wherein setting the use control policy for the target resource comprises:

creating a use control policy resource for the target resource, wherein the use control policy resource comprises the use control policy; or setting an access control data use privilege in a privilege attribute of an access control policy resource of the target resource, wherein the access control data use privilege comprises the use control policy.

13. The electronic device according to claim 10, wherein the data use request comprises an updating request, and the computer program is executed by the one or more processors to further implement:

creating a data analysis functional resource according to a creating request of a functional module, wherein the data analysis functional resource comprises an identifier for a data resource to be analyzed;

triggering the data analysis functional resource according to the updating request of the functional module to acquire the target resource in the data resource to be analyzed;

acquiring a use control policy of the data resource to be analyzed; and upon determination that the use control policy meets the use control policy of the data resource to be analyzed, feeding an update response back to the functional module, thereby enabling the functional module to use the target resource in the data resource to be analyzed according to the use control policy of the data resource to be analyzed.

14. The electronic device according to claim 10, wherein the computer program is executed by the one or more processors to further implement:

receiving the operation request and determining whether the operation request is an acquiring request; and upon determination that the operation request is not the acquiring request, acquiring an access control policy corresponding to the request target and returning a third operation response according to the access control policy corresponding to the request target.

15. The electronic device according to claim 14, wherein the computer program is executed by the one or more processors to further implement:

upon determination that the operation request is the acquiring request, determining whether the requester is the application entity to which the receiver belongs;

upon determination that the requester is not the application entity to which the receiver belongs, returning the second operation response; and upon determination that the requester is the application entity to which the receiver belongs, acquiring the use control policy corresponding to the request target, and when the operation request meets the use control policy for the request target, returning the first operation response.

* * * * *